(12) United States Patent
Odaohhara et al.

(10) Patent No.: US 6,424,123 B1
(45) Date of Patent: Jul. 23, 2002

(54) BATTERY CHARGING SYSTEM AND CHARGE CONTROL APPARATUS

(75) Inventors: Shigefumi Odaohhara, Yamato; Arimasa Naitoh, Fujisawa, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/842,296

(22) Filed: Apr. 25, 2001

(30) Foreign Application Priority Data

Apr. 26, 2000 (JP) .................................... 2000-126015

(51) Int. Cl.$^7$ .................................................. H02J 7/16
(52) U.S. Cl. ........................................ 320/134; 320/160
(58) Field of Search .................................. 320/134, 136, 320/160; 324/426, 427

(56) References Cited

U.S. PATENT DOCUMENTS 6,294,894 B1 * 9/2001 Ochiai et al. ............... 320/132

\* cited by examiner

*Primary Examiner*—Gregory Toatley
(74) *Attorney, Agent, or Firm*—J. Bruce Schelkopf

(57) ABSTRACT

In a charging system used in a computer system employing a rechargeable battery, the number of charging/discharging cycles of the battery is detected based on a charging amount of the battery by a charger. A charging condition for the charger is set to increase the capacity of the battery until the number of charging/discharging cycles reaches a predetermined value, and the charging condition for the charger is set to increase the life of the battery after the number of charging/discharging cycles has reached the predetermined value.

17 Claims, 16 Drawing Sheets

BATTERY CHARGING SYSTEM AND
CHARGE CONTROL APPARATUS

FIELD OF THE INVENTION

The present invention relates generally to a battery charging system, a charge control apparatus, and a charge control method for use in a computer, and particularly to a charging system for charging a rechargeable battery included in an intelligent battery, a charge control apparatus for controlling charge for a battery included in a power supply unit, a charge control method, and a computer employing the charge control method.

BACKGROUND OF THE INVENTION

As mobile computing has become pervasive, portable personal computers (hereinafter referred to as portable PCs) having various sizes and functions have been developed. For instance, they include notebook PC, sub-notebook PC, palmtop PC, and PDA (Personal Digital Assistant).

A portable PC includes an internal battery which is generally removable. This allows a user to operate the portable PC in an environment in which no commercial power supply is available, for instance, in a train. A secondary battery is usually employed s the internal battery which can be repeatedly used by charging.

Conventionally, to charge such a secondary battery, the charging voltage is set to the maximum allowable voltage of the battery to maximize the capacity at the beginning of using the battery (hereinafter referred to as "initial capacity").

However, in the above described conventional technique in which the charging is carried out with the charging voltage set to the maximum voltage of the battery, there is a problem that the life of the battery is shorter than the case in which the charging is performed using a charging voltage lower than the allowable maximum voltage.

Also, the secondary battery is generally characterized in that the total capacity decreases as the discharging and charging are repeated. Further, the decrease in the total capacity is more noticeable as the charging voltage is higher.

FIG. 16 shows an example of the charging characteristics of a lithium-ion battery single cell having a voltage rating of 4.2 V, for charging voltages of 4.10 V and 4.20 V. The ordinate in this figure represents the percentage ratio of capacity to the initial capacity (hereinafter referred to a"capacity ratio"). Accordingly, although the capacity ratio associated with zero charging/discharging cycles is 100% for both charging voltages of 4.10 V and 4.20 V, the actual capacity is different for each charging voltage. Further, the above-described number of charging/discharging cycles means the number of times the discharging is performed until the battery capacity becomes 0% after the charging is performed from 0% to 100% of the battery capacity. As shown in the FIG. 16, the capacity ratio decreases as the number of charging/discharging cycles increases, and the decrease in the capacity ratio is greater for the higher charging voltage.

Accordingly, in the prior art in which charging is performed with the charging voltage set to the allowable maximum voltage of the battery, the battery life is shorter as compared with the case in which charging is performed with a charging voltage lower than the allowable maximum voltage.

SUMMARY OF THE INVENTION

The present invention seeks to solve the above problems, and has as its object the provision of a charging system which enables an increase in the initial capacity of a rechargeable battery whilst also prolonging the battery life.

In accordance with a charging system according to the present invention, a rechargeable battery included in an intelligent battery is charged by a charging device for which a charging condition can be set. The above battery may be any suitable battery type including: lithium-ion battery, nickel-hydrogen battery, nickel-cadmium battery, lithium-polymer battery, or equivalent.

The charging system of the present invention further includes a controller for receiving deterioration information related to the deterioration of the battery. The controller uses this deterioration information to set a charging condition of the charging device to increase battery capacity until the deterioration information meets a predetermined condition, and to set a different charging condition to increase battery life after the deterioration information meets the predetermined condition.

For instance, as a charging condition for increasing the battery capacity when a lithium-ion battery is used, the charging voltage is set to the allowable maximum voltage of the battery or to a predetermined voltage smaller but in the vicinity of the allowable maximum voltage, and similarly, as the charging condition for making the battery life longer, the charging voltage is set to a voltage lower than the charging voltage which is applied as the charging condition for increasing battery capacity.

The above-mentioned predetermined condition is used to indicate the timing for switching a charging condition from giving priority to a higher capacity to giving priority to a longer life. If, for instance, the user of the intelligent battery prefers a longer life to a higher capacity for the battery, a mode can be applied for setting the above predetermined condition to be met when the deterioration information indicates a lower degree of deterioration, and conversely, if the user prefers a higher capacity to a longer life for the battery, a mode can be applied for setting the above predetermined condition to be met when the deterioration information indicates a higher degree of deterioration. In this case, either the individual users may set the predetermined condition, or the predetermined condition may be set based on previous statistical examination of the intentions of users.

Further, regardless of the user's intention, for instance, the condition indicating the timing that can maximize the accumulated value of total capacities to the life of the battery provided in the intelligent battery related to the present invention (generally the period until the total capacity of a full-charged battery becomes 60% of the initial capacity) can be previously obtained by an experiment, computer simulation, or the like, and this condition can be applied as the above predetermined condition.

As described above, since the charging system of the present invention receives the deterioration information related to the deterioration of a battery from the intelligent battery, sets the charging condition of the charging device to make the battery capacity higher until the deterioration information meets a predetermined condition, and sets the charging condition to make the battery life longer after the deterioration information meets the predetermined condition, the initial capacity of the battery can be made larger and the life of the battery can be made longer.

The deterioration information of the charging system may be at least one of: the number of charging/discharging cycles of the battery, the capacity of the battery, and a value corresponding to the internal resistance of the battery.

That is, as described with reference to FIG. 16, since a rechargeable battery is generally characterized in that its total capacity decreases as the number of charging/discharging cycles increases, the number of charging/discharging cycles of the battery can be applied as information indicating the deterioration state of the battery. Further, any information that can provide the capacity of the battery can also be applied as information indicating the deterioration state of the battery. Furthermore, since a deteriorated battery usually tends to have an increase in internal impedance, the degree of deterioration of the battery can be determined based on a value corresponding to the internal resistance of the battery. Therefore, the value corresponding to the internal resistance of the battery can be applied as information indicating the deterioration state of the battery.

Further, if the number of charging/discharging cycles of the battery is included in the deterioration information, it can be assumed that the number of charging/discharging cycles is detected in a manner in which the charging amount or discharging amount of the battery is detected, and for the detected amount, the total capacity of the battery or a capacity obtained by multiplying the total capacity of the battery by a predetermined coefficient is employed as unit cycle. The reason for this is described below.

FIG. 15 shows an example of the actual measurement result of the cycle characteristics for a partial discharge and a 100% discharge of an existing battery. The measurement conditions for this are shown below.

Battery: Lithium-ion battery single cell
Temperature: 25° C.
Charging method: Constant voltage, constant current charging method (constant voltage: 4.2 V, constant current: 1.6 A)
Charging time: A three-hour charging was performed unconditionally.
Method for capacity measurement: When each partial discharge reached 100 cycles, discharging was performed with a 1.6 A constant current discharge until the battery voltage reached 2.75 V, and the capacity was measured.

The abscissa in FIG. 15 represents the number of charging/discharging cycles on a 100% discharge basis. That is, for a 20% partial discharge, the number of charging/discharging cycles is counted as one when the 20% partial discharge is repeated five times.

As shown in the same figure, the 20% partial discharge, 30% partial discharge, and 50% partial discharge are on substantially the same line. However, for the 20% partial discharge, it slightly deviates from the line when the number of charging/discharging cycles becomes 350 or larger. The reason for this is considered to be the occurrence of deterioration due to the three-hour constant-time charging. That is, the capacity reaches 100% in a short time by the charging, but the continuation of the charging causes the deterioration. In electronic equipment, however, since the charging is usually stopped when the capacity reaches 100%, it seems that the 20% partial discharge also lies on the same line as the 30% partial discharge and 50% partial discharge.

From the foregoing, it is possible that the charging amount or the discharging amount is accumulated, and one cycle is counted when the accumulated amount equals an amount obtained by multiplying the total capacity of the battery by a predetermined coefficient (about 0.9 for the battery of FIG. 15), and the battery capacity can be estimated from the number of charging/discharging cycles.

Since the number of charging/discharging cycles of the battery can be detected employing the total battery capacity or alternatively by a capacity obtained by multiplying the total battery capacity by a predetermined coefficient as unit cycle, as described above, the number of charging/discharging cycles can be simply and accurately detected even if the battery capacity does not reach zero or a predetermined capacity in the vicinity of zero.

The charging condition employed in the present invention may be the charging voltage of the battery or the determination condition for charging termination of the battery.

That is, for instance, since the charging of a lithium-ion battery is carried out by the constant-current, constant-voltage method, the charging voltage can be switched to change the charging condition from that for making the battery capacity higher to that for making the battery life longer. Further, for instance, the charging of the nickel-hydrogen battery employs the constant-current charging method, and the completion of the charging is determined by the value of $\Delta T$ which is a temperature elevation value based on the temperature at the beginning of the charging, or the value of $\Delta T/\Delta t$ which is a temperature elevation value per unit time. Accordingly, for the nickel-hydrogen battery, by changing the determination condition for charging termination of at least either of $\Delta T$ or $\Delta T/\Delta t$, the charging condition can be changed from that for making the battery capacity higher to that for making the battery life longer. Further, for instance, the nickel-cadmium battery terminates the charging by detecting a change in the battery voltage. Accordingly, for the nickel-cadmium battery, by changing the determination condition for charging termination based on the deviation of the battery voltage, the charging condition can be switched from that for making the battery capacity higher to that for making the battery life longer.

According to other aspects of the invention, a charge control apparatus and charge control method are used to control the charging of a rechargeable battery included in a power supply unit. Deterioration information indicating the deterioration state of the battery is detected, and the charging condition for the battery is set to make the battery capacity higher until the deterioration information meets a predetermined condition, and the charging condition is set to make the battery life longer after the deterioration information meets the predetermined condition. The above battery may be one of lithium-ion battery, nickel-hydrogen battery, nickel-cadmium battery, lithium-polymer battery, and the like.

Accordingly, since the charge control apparatus and charge control method related to the present invention operate in a manner similar to the charging system related to the present invention, the initial capacity of the battery included in the power supply unit can be increased and the battery life can be also be increased. The deterioration information may be one of: the number of charging/discharging cycles of the battery, the capacity of the battery, and a value corresponding to the internal resistance of the battery.

Also, in the charge control apparatus and charge control method related to the present invention, where the number of charging/discharging cycles of the battery is employed as the deterioration information, the discharging amount or charging amount of the battery is detected, and for the detected amount, the number of the charging/discharging cycles of the battery can be detected by employing the total capacity of the battery or a capacity obtained by multiplying the total capacity of the battery by a predetermined coefficient as unit cycle. By this, the number of charging/discharging cycles can be simply and accurately counted even if the battery capacity is not zero or a predetermined capacity in the vicinity of zero.

Further, in the charging control apparatus and charging control method of the present invention, the charging condition can be the charging voltage of the battery or the determination condition for charging termination of the battery.

Further, to apply the charging control method related to the present invention to a computer including a CPU, a memory, a display, and input devices, which are interconnected by a bus, it can be implemented by making the memory from a machine-readable recording medium having recorded thereon a program for controlling the charging to the battery according to the charging control method of the present invention.

Further, to apply the charging control method related to the present invention to a computer including a CPU, a memory, a display, input devices, and a network connection device, which are interconnected by a bus, it can be implemented by employing, as the external storage device of the server computers arranged on a network connected by the network connection device, a machine-readable recording medium having recorded thereon a program for controlling the charging to the battery according to the charging control method of the present invention.

DETAILED DESCRIPTION OF THE PREFERRED EMBODIMENTS

The embodiments of the present invention will now be described in detail with reference to the drawings.

First Embodiment

Figure 1:
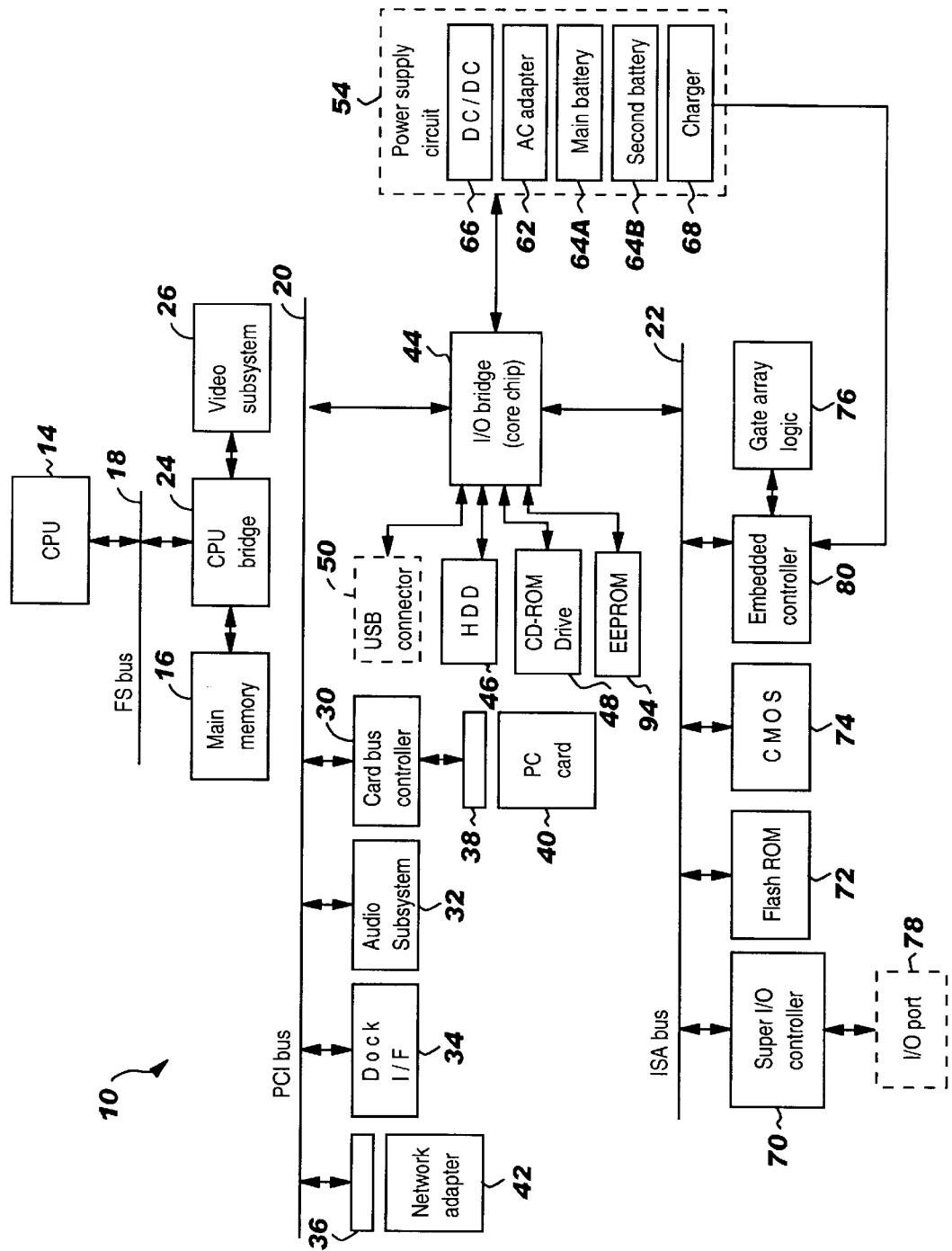
FIG. 1 is a block diagram showing the schematic construction of the computer system according to an embodiment of the present invention.

FIG. 1 diagrammatically shows the hardware configuration of a computer system 10 consisting of a typical personal computer (PC), to which the present invention is applied, for each subsystem. Each part of the computer system 10 is described below.

A CPU 14, which is the brain of the whole computer system 10, executes various programs under the control of an OS.

The CPU 14 is interconnected to the various hardware structural elements to be described later, through three levels of buses: a FS (Front Side) bus 18 as a processor direct connection bus which is directly connected to the external pin of itself, a PCI bus (Peripheral Component Interconnect) bus 20 for high-speed I/O devices, and an ISA (Industry Standard Architecture) bus 22 for low-speed I/O devices.

The FS bus 18 and the PCI bus 20 are interconnected by a CPU bridge (host-PCI bridge) 24, which is usually called a memory/PCI control chip.

A main memory 16 is a writable memory, which is used as an area to which the execution program of the CPU 14 is written, or a work area to which the processing data of the execution program is written.

The PCI bus 20 is a bus of the type enabling relatively high speed data transfer, to which PCI devices driven at a relatively high speed, such as a card bus controller 30, are connected.

Figure 2:
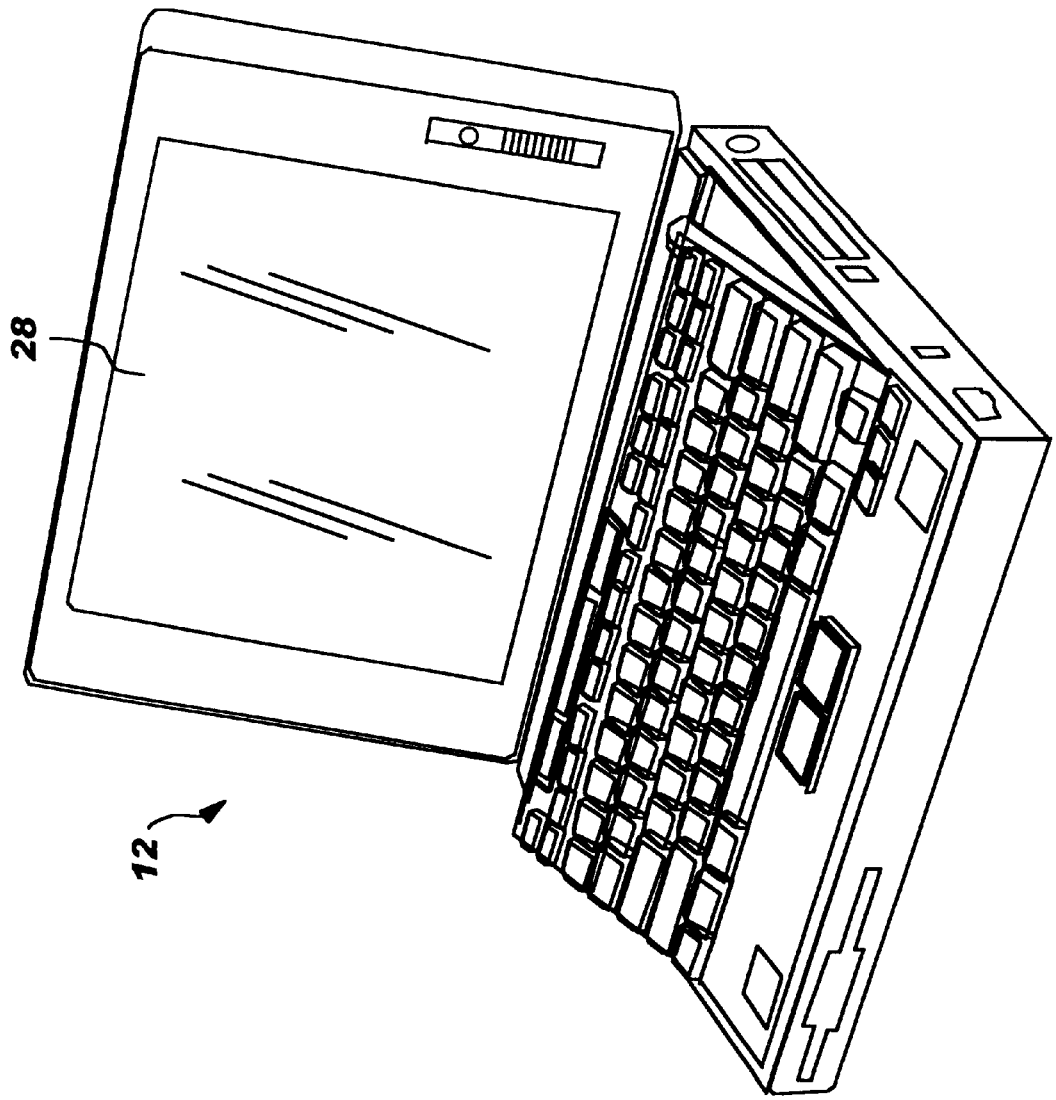
FIG. 2 is a perspective view showing the external appearance of a notebook PC.

A video subsystem 26 is a subsystem for implementing functions related to video, and it includes a video controller, which actually processes the drawing instruction from the CPU 14 and once writes the processed drawing information to a video memory (VRAM), and reads the drawing information from the VRAM and outputs it as drawing data to a liquid crystal display (LCD) 28 (refer to FIG. 2).

Further, to the PCI bus 20, the card bus controller 30, an audio subsystem 32, a docking station interface (Dock I/F) 34, and a mini PCI slot 36 are connected, respectively.

The Dock I/F 34 is hardware for connecting the PC 12 and a docking station (not shown). Further, to the mini PCI slot 36, for instance, a network adapter 42 is connected for connecting the computer system 10 to a network (for instance, LAN).

The PCI bus 20 and the ISA bus 22 are interconnected by an I/O bridge 44. The I/O bridge 44 includes the bridge function between the PCI bus 20 and the ISA bus 22, an IDE (Integrated Drive Electronics) interface function, and a USB (Universal Serial Bus) function, and also includes a real time clock (RTC), and for instance, a device (core chip) named PIIX4, made by Intel Corporation, can be used.

Further, a USB port is provided in the I/O bridge 44, and the USB port is connected to a USB connector 50 provided, for instance, in the wall surface of the PC 12.

Further, the I/O bridge 44 is connected to a power supply circuit 54. The power supply circuit 54 includes an AC adapter 62, a charger 68 for charging a main battery 64A as a secondary battery or a second battery 64B, and a DC/DC converter 66 for generating d.c. constant voltages of 5 V and 3.3 V which are used in the computer system 10. In addition, the main battery 64A and the second battery 64B are both made up of three serially connected lithium-ion battery single cells of a rating voltage of 4.2 V.

On the other hand, in the core chip forming the I/O bridge 44, there are provided an internal register for managing the power state of the computer system 10, and a logic (state machine) for performing the management of the power state of the computer system 10, including the operation of the internal register.

The above-mentioned logic sends and receives various signals between the power supply circuit 54, and by the sending and receiving of signals, it recognizes the actual power supply from the power supply circuit 54 to the computer system 10, and the poser supply circuit 54 controls the power supply to the computer system 10 according to the instructions from the above logic.

The ISA bus 22 is a bus whose data transfer speed is lower than the PCI bus 20, and it is used to connect a super I/O controller 70, a flash ROM 72 formed from EEPROM or the like, a CMOS 74, and an embedded controller 80 connected to a gate array logic 76 as well as peripheral devices (all not shown) such as a keyboard/mouse controller, which operate at a relatively low speed.

An I/O port 78 is connected to the super I/O controller 70. The super I/O controller 70 controls the driving of a floppy disk drive (FDD), the input/output of parallel data through a parallel port, the input/output of serial data through a serial port.

The flash ROM 72 is a memory to hold a program such as BIOS, and it is nonvolatile and the memory contents of it can be electrically rewritten. Further, the CMOS 74 is formed by connecting a volatile semiconductor memory to a backup power supply, and functions as a nonvolatile and fast memory means.

The embedded controller 80 controls a keyboard, not shown, and shares part of the power management function in cooperation with the gate array logic 76 by a power management controller included in it.

Figure 3:
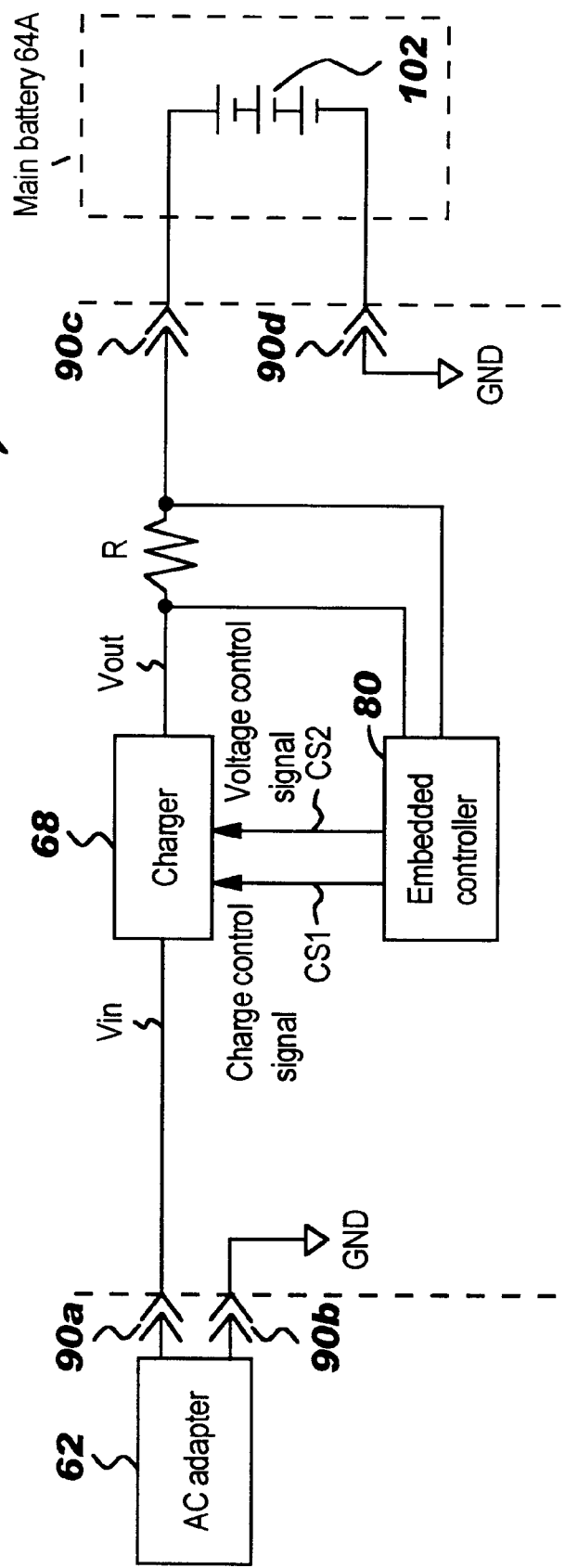
FIG. 3 is a block diagram showing a construction example of the portion related to the charging to the main battery of the computer system related to the first embodiment.

The construction of the portion related to the charging of the main battery 64 is now described. FIG. 3 shows the construction of only the extracted portion related to the charging to the main battery 64A. As shown in the same figure, the input terminal of the charger 68 included in the power supply circuit 54 is connected to a terminal 90a, and the output terminal is connected to a terminal 90c via a resistor R for detecting the charging amount for a battery 102, to be described later, included in the main battery 64A.

Further, the two terminals of the resistor R are connected to the embedded controller 80, which is constructed so that it can detect the charging amount to the battery 102 based on the magnitude of the current flowing in the resistor R. Furthermore, the embedded controller 80 is connected to the charger 68, the operation of which is controlled by the embedded controller 80.

On the other hand, the main battery 64A comprises the battery 102, which is formed by serially connecting three lithium-ion battery single cells having a rating voltage of 4.2 V. Further, the terminals 90b and 90d are grounded within the computer system 10, and the positive and negative electrodes of the battery 102 in the main battery 64A are connected to the terminal 90c and the terminal 90d, respectively.

When the computer system 10 is under an environment where a commercial power supply is available, the user connects the AC adapter 62 to the terminals 90a and 90b. Using the power supplied by the AC adapter 62, the charger 68 charges the main battery 64A according to a charge control signal CS1 and a voltage control signal CS2 which are input from the embedded controller 80.

Further, the construction of the portion related to the charging to the second battery 64B is also made similar to that shown in FIG. 3. However, the charger 68 is constructed to selectively charge either the main battery 64A or the second battery 64B when the embedded controller 80 changes a switch, not shown.

Furthermore, in the computer system 10 related to this embodiment, there is provided a battery pack storage (not shown), and the above main battery 64A and second battery 64B are removably mounted in the battery pack storage. In addition, the main battery 64A and the second battery 64B are connected to the terminals 90c and 90d while they are mounted in the battery pack storage.

Figure 4:
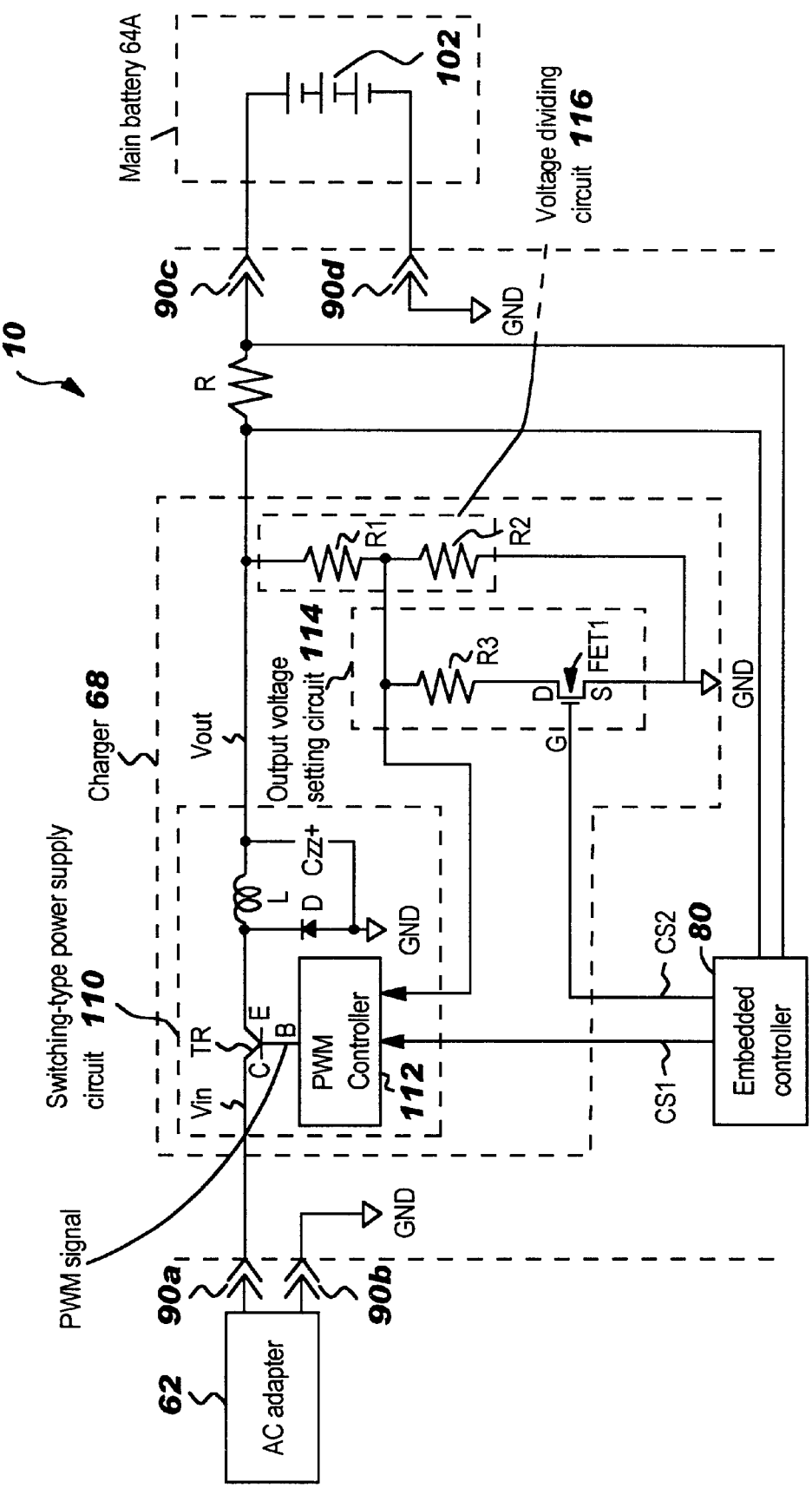
FIG. 4 is a block/circuit diagram showing a construction example of the charger related to the embodiment.

Now, referring to FIG. 4, the construction of the charger 68 is described in detail. As shown in the same figure, the charger 68 related to this embodiment comprises a switching-type power supply circuit 110, an output voltage setting circuit 114, and a voltage dividing circuit 116.

The switching-type power supply circuit 110 includes a transistor TR, and the collector C of the transistor TR is connected to the terminal 90a and applied with an input voltage Vin from the AC adapter 62. Further, the base B of the transistor TR is connected to the output terminal for outputting a PWM (Pulse Width Modulation) signal of a PWM controller 112, which is connected to the output terminal for outputting the charge control signal CS1 of the embedded controller 80.

On the other hand, the emitter E of the transistor TR is connected to one terminal of an inductor L to which a flywheel diode D and a capacitor C are connected in the shape of $\text{Π}$ (the terminal on the side to which the flywheel diode D is connected).

A filter is made up of the flywheel diode D, inductor L, and capacitor C.

The PWM controller 112 is constructed so that it is put in a state of outputting the PWM signal when the charge control signal CS1 input from the embedded controller 80 is at high level, and it is put in a state of not outputting the PWM signal when at low level.

The voltage dividing circuit 116 is formed by serially connecting resisters R1 and R2, and the terminal on the side of the resistor R1 which is not connected to the resister R2 is connected to the other terminal of the inductor L (the terminal on the side to which the capacitor C is connected), that is, the terminal from which the output voltage Vout of the switching-type power supply circuit 110 is output, and the terminal of the resistor R2 which is not connected to the resistor R1 is grounded. Further, the junction of the resistor R1 and the resistor R2 is connected to the PWM controller 112.

On the other hand, the output voltage setting circuit 114 comprises a MOS field effect transistor (FET) 1 and a resistor R3. The gate G of the FET 1 is connected to the output terminal for outputting the voltage control signal CS2 of the embedded controller 80, the drain D is connected to the junction of the resistor R1 and the resister R2 via the resistor R3, and the source S is grounded.

In the charger 68 shown in the same figure, the output voltage Vout is divided according to the proportion of the respective resistance values of the resistor RI and the resistor R2, and the divided output voltage Vout is fed back to the PWM controller 112.

In the PWM controller 112, the fed-back voltage is compared with a predetermined reference voltage, and the duty ratio of the PWM signal is made smaller if the fed-back voltage is higher than the reference voltage, while the duty ratio is made larger if the fed-back voltage is lower than the reference voltage. This allows the fed-back voltage to be controlled to match the reference voltage, by which the output voltage Vout is stabilized.

If the voltage control signal CS2 input to the gate G of the FET 1 by the embedded controller 80 is made low level, the FET 1 is turned off. Accordingly, in this case, the resistor R3 has no effect on the voltage dividing circuit 116, and the voltage fed-back to the PWM controller 112 is divided according to the proportion of the resistance values in the voltage dividing circuit 116.

On the other hand, conversely, if the voltage control signal CS2 is made high level, the FET 1 is turned on. Accordingly, in this case, the resistor R3 and the resistor R2 are put in a parallel connection state, so the voltage fed-back to the PWM controller 112 becomes low as compared with the case in which the voltage control signal CS2 is at low level, and the duty ratio of the PWM signal output from the PWM controller 112 is made larger, making the output voltage Vout higher.

Further, in this embodiment, the reference voltage used in the PWM controller 112, the resistance values of the resistors R1 and R2 of the voltage dividing circuit 116, the resistance value of the resistor R3 of the output voltage setting circuit 114, and the like are preset so that the voltage applied to the lithium-ion battery single cells forming the battery 102 becomes 4.20 [V/cell] if the voltage control signal CS2 is at high level, and 4.10 [V/cell] if the voltage control signal CS2 is at low level.

Furthermore, to form the computer system 10, many electric circuits other than those shown in FIGS. 1 and 3 are also required. However, these are well known to a person skilled in the art and are not required for an understanding of the present invention, so the description of them is omitted in the specification. Moreover, it is additionally noted that the connections between the various hardware blocks in figures are only partially shown to avoid confusion in the drawings.

Figure 5:
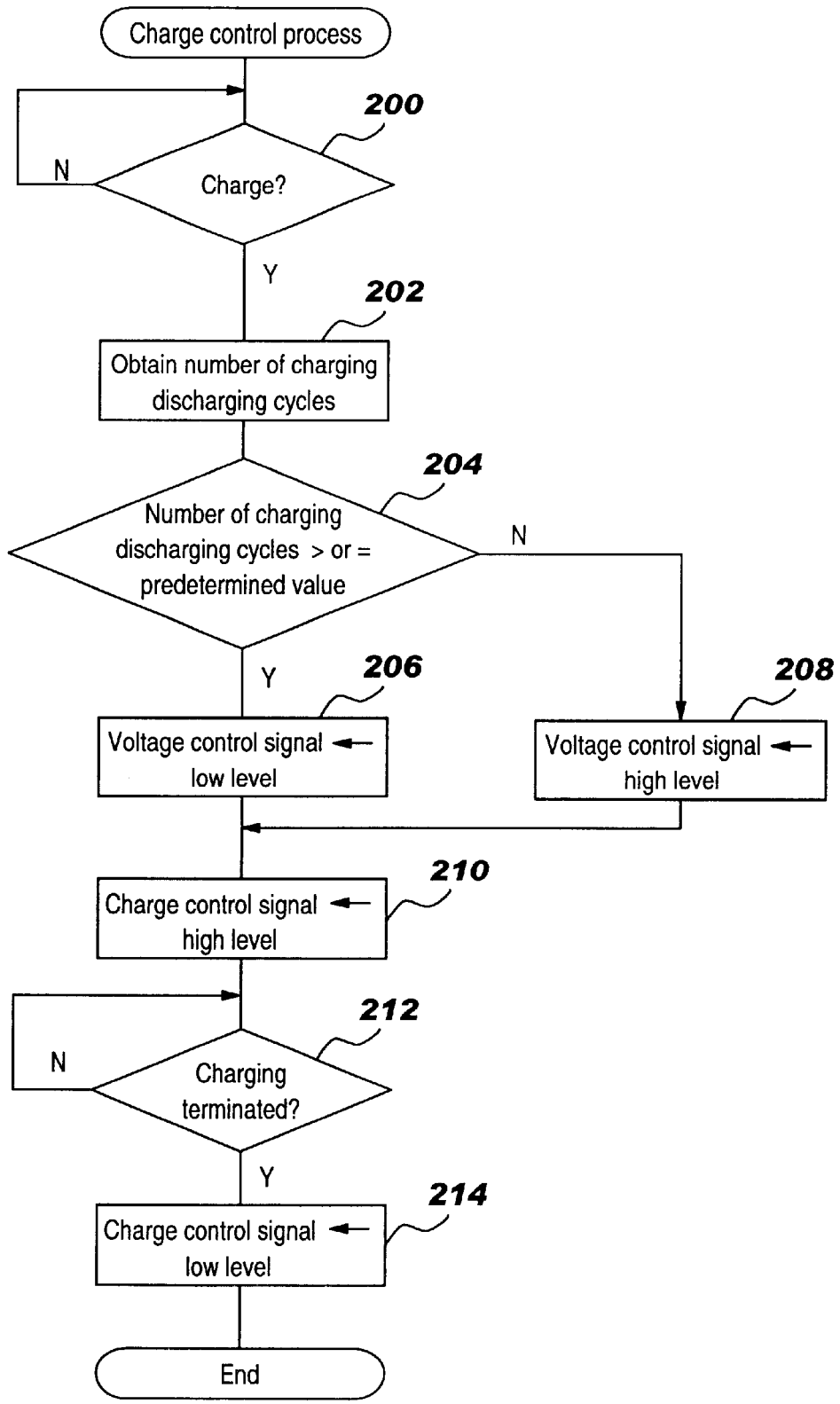
FIG. 5 is a flowchart showing the flow of a charge control processing program executed by the embedded controller of the first embodiment.
Figure 6:
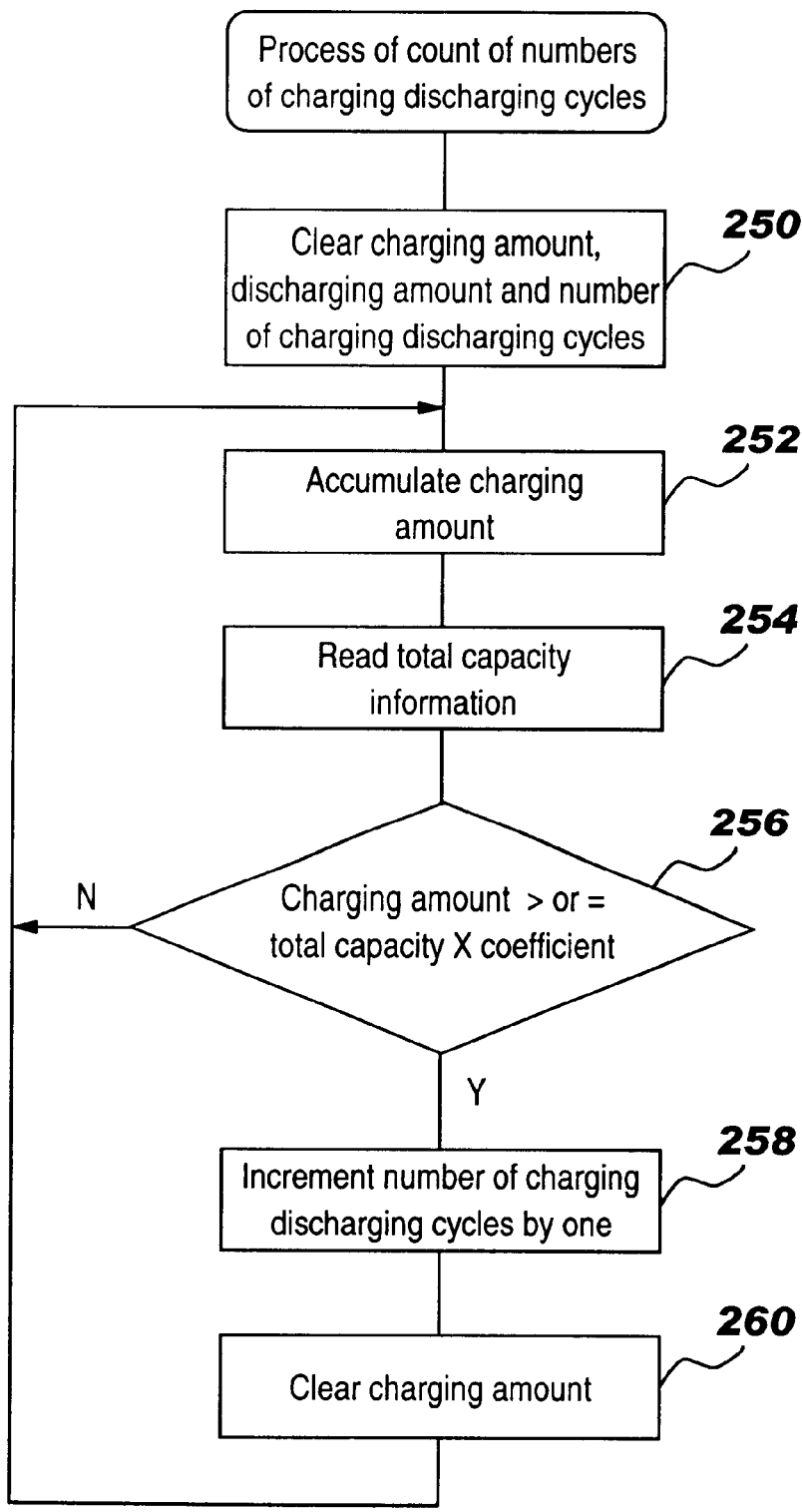
FIG. 6 is a flowchart showing the flow of a program for processing the count of the number of charging/discharging cycles, which is executed by the embedded controller of the first embodiment.

With reference to FIGS. 5 and 6, description is now made to the processing to be performed to carry out the charge control of the main battery 64A by the embedded controller 80. FIG. 5 is a flowchart showing the flow of a charge control processing program executed by the embedded controller 80, FIG. 6 is a flowchart showing the flow of a program for processing the count of the number of charging/discharging cycles, which is executed by the embedded controller 80, and these programs are both previously stored in a memory, not shown, which is included in the embedded controller 80.

In step 200 of FIG. 5, the process waits for a state in which the main battery 64A should be charged, and moves to step 202 at the point when the charging should be performed. The determination as to whether or not the main battery 64A should be charged is made by determining that it should be charged if the AC adapter 62 is connected to the computer system 10 and the main battery 64A is not in a full-charge state.

In step 202, the number of charging/discharging cycles counted by the program for processing the count of the number of charging/discharging cycles to be described later is acquired.

In the next step 204, it is determined whether or not the acquired number of charging/discharging cycles is larger than a predetermined value, and if it is larger than the predetermined value (the determination is positive), the process moves to step 206 where step 210 is entered after the voltage control signal CS2 is made low level, and if it is not larger than the predetermined value (the determination is negative), the flow moves to step 208 where step 210 is entered after the voltage control signal CS2 is made high level.

The above-mentioned predetermined value is a value showing the number of charging/discharging cycles for which the charging voltage of the main battery 64A should be changed to lower one, and in this embodiment, 50 is preset as the above predetermined value. That is, in this embodiment, if the number of charging/discharging cycles is less than 50, a charging mode for making the capacity of the battery 102 as high as possible (hereinafter referred to as "high capacity mode") is selected, and if the number of charging/discharging cycles is 50 or larger, a charging mode for making the life of the battery 102 longer (hereinafter referred to as "long life mode") is selected. The above predetermined value corresponds to the predetermined condition, the number of charging/discharging cycles corresponds to the deterioration information, and the charging voltage corresponds to the charging condition.

In step 210, the charge control signal CS1 is made high level. By this, the outputting of the PWM signal from the PWM controller 112 is started, and the outputting of the output voltage Vout of a magnitude corresponding to the duty ratio of the above PWM signal from the charger 68 is started, by which the charging to the battery 102 is initiated.

If the number of charging/discharging cycles of the battery 102 in the main battery 64A is less than 50, the output voltage Vout output from the charger 68 is made a voltage which makes the voltage applied to the battery 102 become 4.20 [V/cell] since the voltage control signal CS2 has been made high level in the above step 208, and charging according to the high capacity mode is carried out. On the other hand, if the number of charging/discharging cycles of the battery 102 in the main battery 64A is 50 or larger, the output voltage Vout output from the charger 68 is made a voltage which makes the voltage applied to the battery 102 becomes 4.10 [V/cell] since the voltage control signal CS2 has been made low level by the above step 206, and charging in the long life mode is carried out.

In the next step 212, the process waits for a state in which the charging to the main battery 64A should be terminated, and moves to step 214 at a point when the charging should be terminated. The determination as to whether or not the charging to the main battery 64A should be terminated is made by determining that the main battery 64A is in a state if it is in a full-charge state.

In step 214, after making the charge control signal CS1 low level to stop the output of the output voltage Vout from the charger 68, this charge control processing program is ended.

Referring to FIG. 6, the process for counting the number of charging/discharging cycles is described below. The description is made on the presumption that information showing the total capacity of the battery 102 is previously stored in a memory, not shown, which is included in the embedded controller 80, and this information is always corrected by the embedded controller 80 according to the number of charging/discharging cycles of the battery 102.

In step 250 of the same figure, the charging amount or the number of charging/discharging cycles is cleared, and in the next step 252, the charging amount obtained based on the value of the current flowing in the resistor R is accumulated, and in the next step 254, the total capacity of the battery 102 is obtained by reading the information showing the total capacity of the battery 102 from the memory, not shown, which is included in the embedded controller 80, and in the next step 256, it is determined whether or not the charging amount accumulated up to this point of time is equal to or larger than a value obtained by multiplying the total capacity by a predetermined coefficient (in this embodiment, 0.9), and if the determination is positive, deeming that the charging for one cycle has been made, the process moves to step 258 where the number of charging/discharging cycles is incremented by 1, and thereafter the charging amount is cleared in step 260, returning to the above step 252.

On the other hand, if the determination in the above step 256 is negative, the process returns to the above step 252 without carrying out the processing in the above steps 258 and 260.

By repeating the above steps 252 to 260, the charging amount is accumulated for each cycle, and the number of charging/discharging cycles is incremented each time the charging for one cycle is performed. That is, originally, the number of charging/discharging cycles means the number of times the discharging is performed until the battery capacity becomes 0% after performing the charging until the battery capacity changes from 0% to 100%, but, in this embodiment, one cycle means that it is deemed based on the accumulated amount of the charging amount that the charging has been performed from 0% to 100% of the battery capacity. The reason for deeming that the battery capacity has become from 0% to 100% according to the accumulated value of the charging amount is as described above.

Also for the second battery 64B, a processing for charging similar to the foregoing is carried out by the embedded controller 80.

Figure 7:
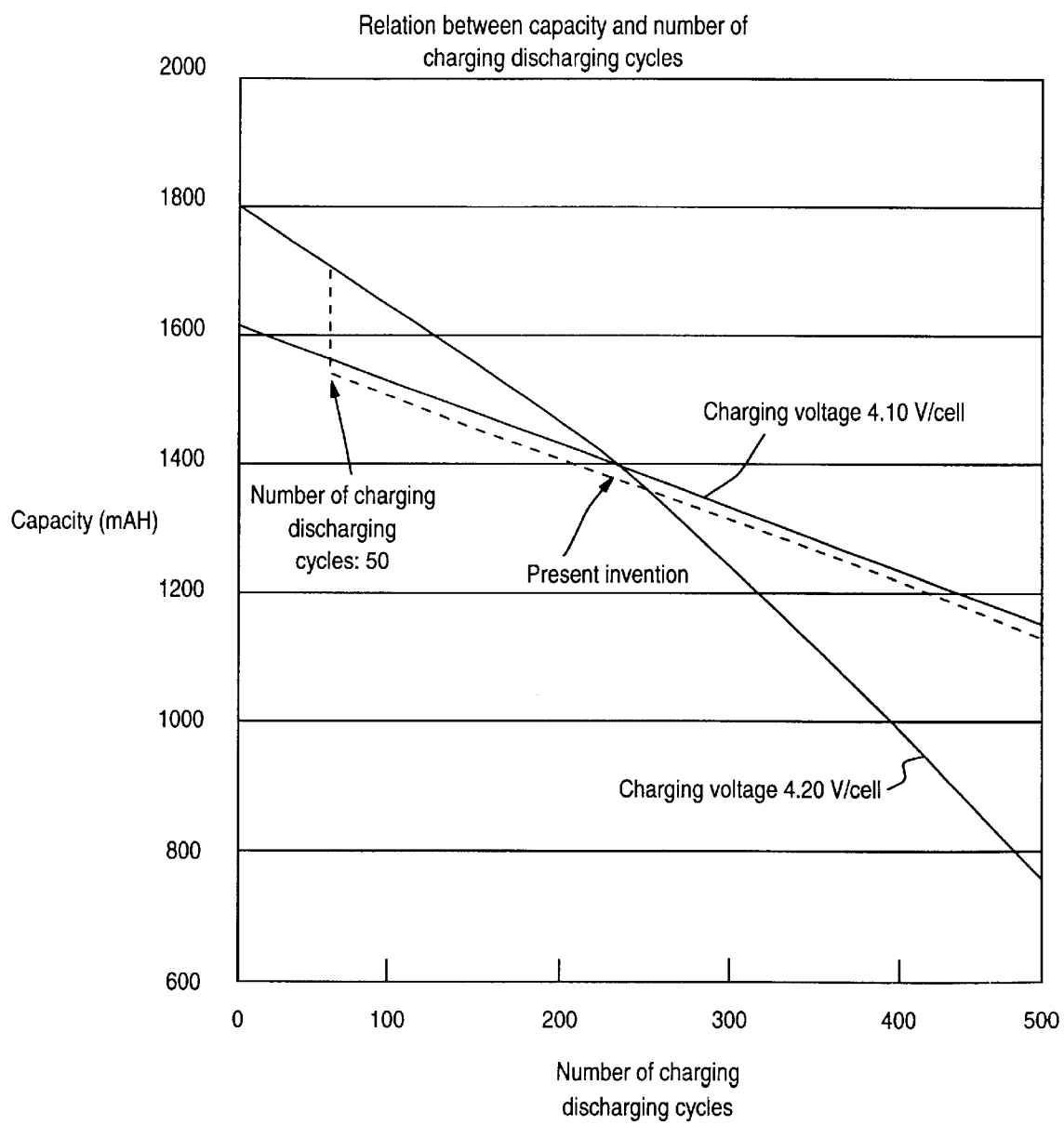
FIG. 7 is a graph showing an example of the relation between battery capacity and the number of charging/discharging cycles.

FIG. 7 shows the relations between the number of charging/discharging cycles and the battery capacity (single cell) for three cases: the case in which the charging voltage of the battery is 4.10 [V/cell], the case in which the charging voltage of the battery is 4.20 [V/cell], and the case in which the number of charging/discharging cycles by this embodiment is 50 and switching is made from 4.20 [V/cell] to 4.10 [V/cell].

Figure 16:
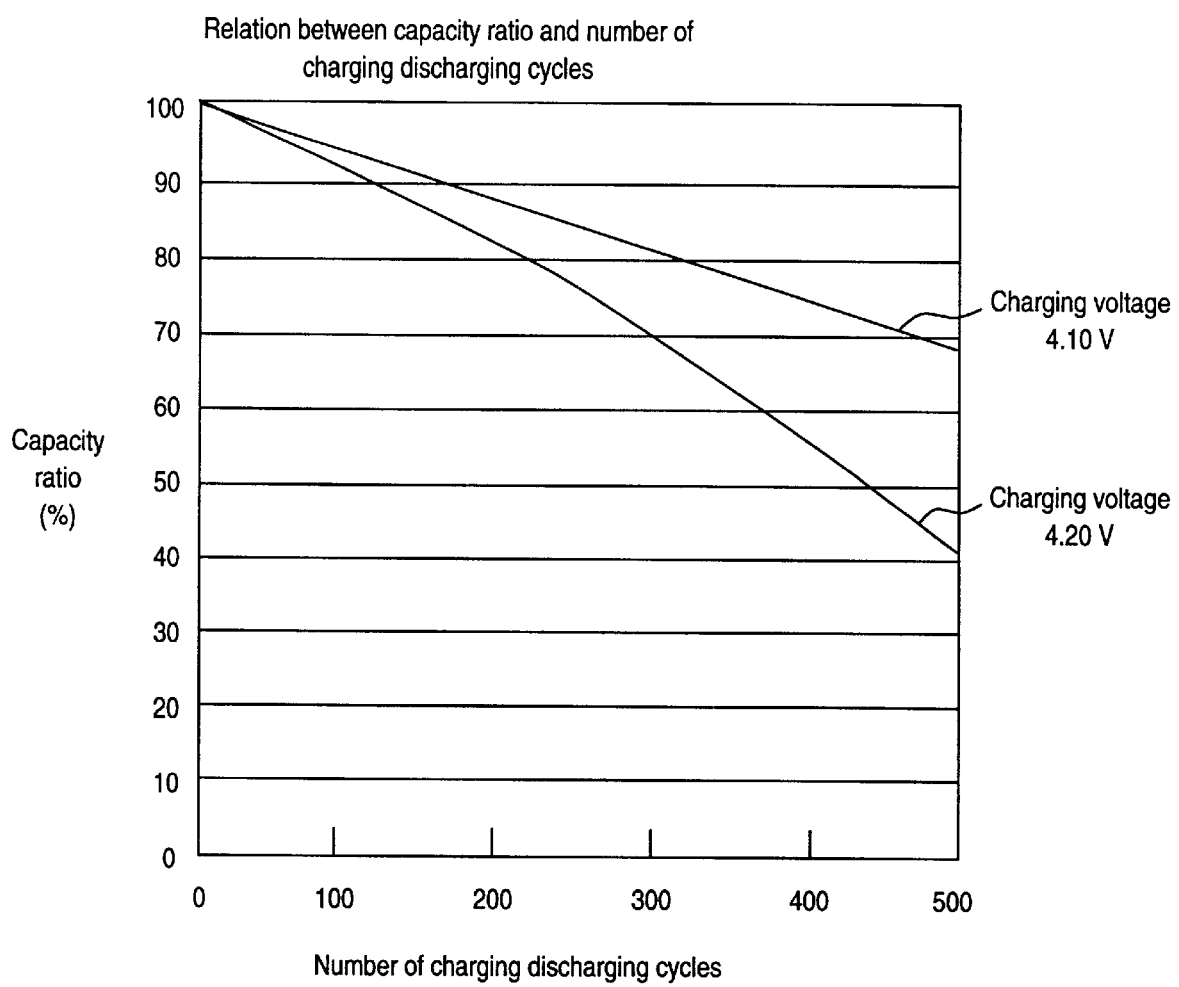
FIG. 16 is a graph showing an example of the relation between the capacity ratio and the number of charging/discharging cycles of a battery.

As shown in the same figure, it is similar to the description made with reference to FIG. 16 in the point that, if the charging voltage is 4.10 [V/cell], the battery life can be made longer, but the battery capacity is low from the time it is begun to be used, and if the charging voltage is 4.20 [V/cell], the battery life becomes shorter though the battery capacity at the beginning of use is higher. However, according to this embodiment, if 4.20 [V/cell] is switched to 4.10 [V/cell] when the number of charging/discharging cycles is 50, the battery capacity at the beginning of use can be made higher and the battery life can also be made longer.

As described above, in the computer system related to the first embodiment, the number of charging/discharging cycles of a battery is detected as deterioration information indicating the deterioration state of the battery, and the charging condition of the battery is set to a condition (high capacity mode) for making the battery capacity higher until the number of charging/discharging cycles reaches a predetermined value (in this embodiment, 50), and the charging condition of the battery is set to a mode (long life mode) for making the battery life longer after the number of charging/discharging cycles becomes equal to or larger than a predetermined value, so that the initial capacity of the battery can be made larger and the life of the battery can also be made longer.

Further, in the computer system related to the first embodiment, the charging amount of the battery is detected, and for the charging amount, the number of charging/discharging cycles of the battery is detected by employing a capacity obtained by multiplying the total capacity of the battery by a predetermined coefficient as unit cycle, so that, even if the battery capacity is not zero or in the vicinity of zero, the number of charging/discharging cycles can be simply and accurately detected.

Figure 8:
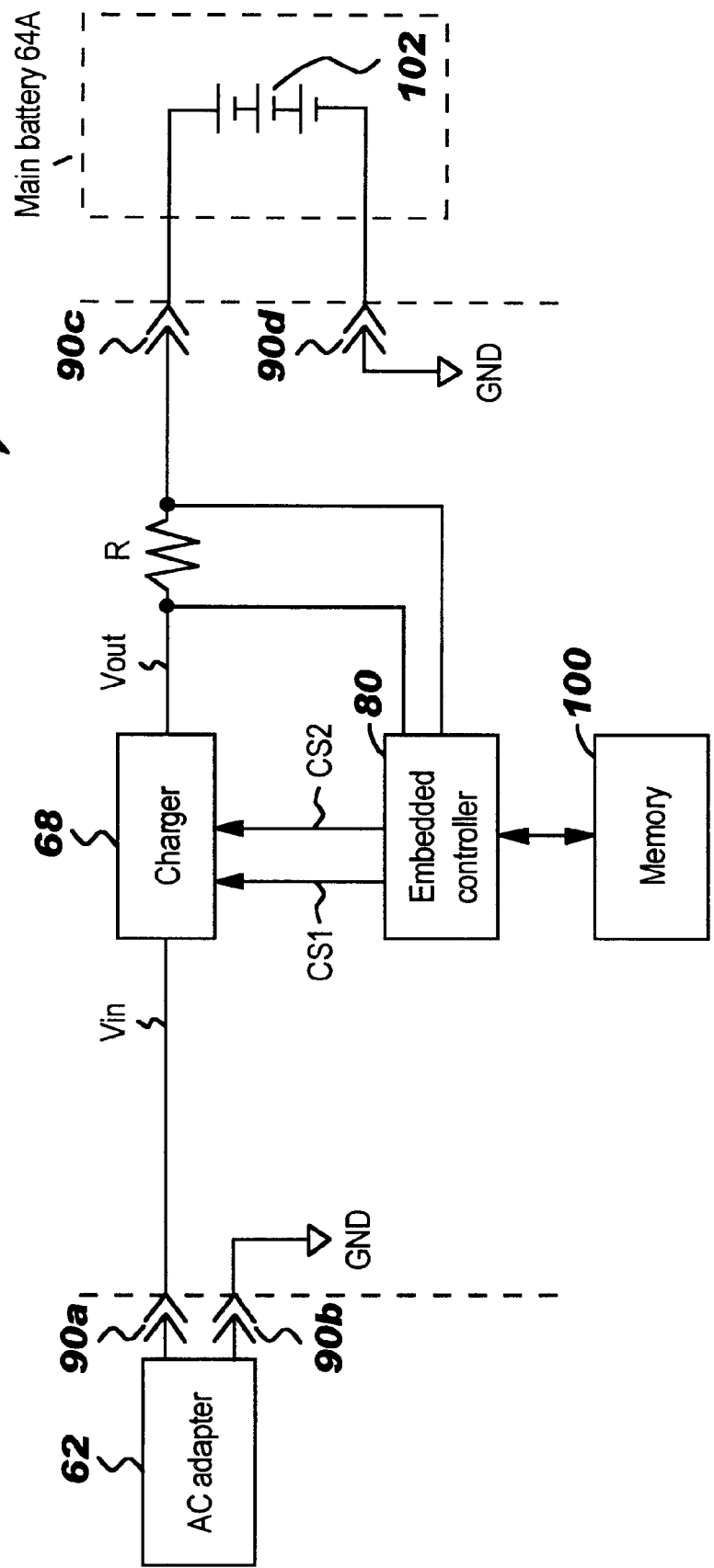
FIG. 8 is a block diagram showing an alternative example of the construction related to the first embodiment.

In addition, in the first embodiment, although description has been made to the case in which the embedded controller 80 holds the number of charging/discharging cycles of the battery 102 by itself, it is to be understood that a memory 100 can be provided externally of the embedded controller 80 as shown in FIG. 8, and the number of charging/discharging cycles can be stored in the memory 100.

Second Embodiment

In the second embodiment, description is made to an aspect in which a battery including a memory is applied as the battery subjected to charge control. Further, since the constructions other than the construction of the portion related to the charging of the main battery and the second battery are similar to the above described first embodiment, the description of them is omitted.

Figure 9:
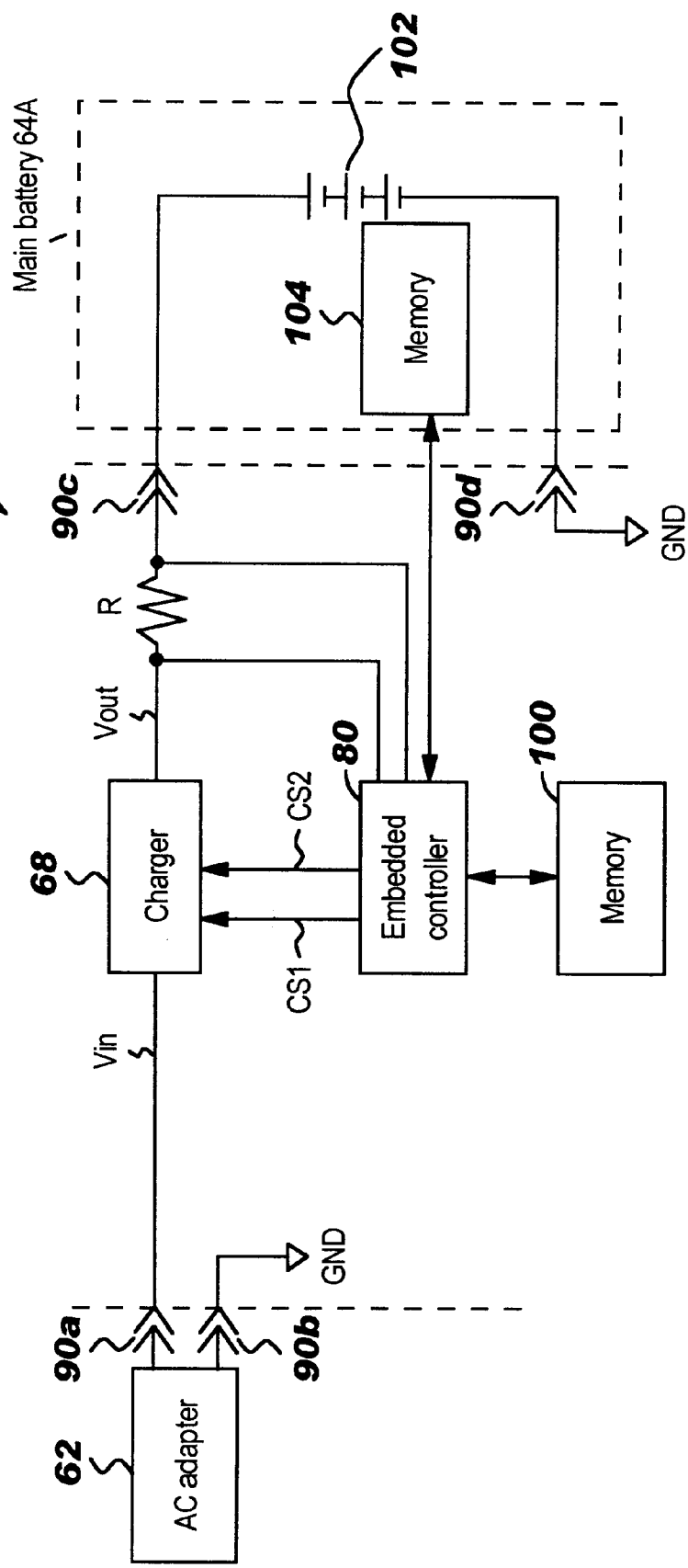
FIG. 9 is a block diagram showing a construction example of the portion concerning the charging to the main battery of the computer system related to the second embodiment.

FIG. 9 shows the construction only of the extracted portion related to the charging to the main battery 64A' related to the second embodiment. Further, the portions in the same figure which are similar to FIG. 3 are assigned the same symbols as FIG. 3, and the description of them is omitted.

As shown in the same figure, the main battery 64A' related to the second embodiment is different from the main battery 64A related to the above first embodiment in the point that a memory 104 for storing various information is provided. The embedded controller 80 related to the second embodiment is constructed to communicate with the memory 104, and the reading and writing of the memory contents of the memory 104 can be performed by the embedded controller 80.

In the memory 104, a number of charging/discharging cycles for switching the high capacity mode and the long life mode (hereinafter referred to as"number of charging/discharging cycles for switching") is previously stored. That is, since the number of charging/discharging cycles for which the high capacity mode and the long life mode should be switched depends on the type of the battery (including battery maker, battery technology), the computer system 10 can support a plurality types of batteries by storing the number of charging/discharging cycles in the memory 104 included in the battery. Further, in the memory 104, an area is defined for storing the actual number of charging/discharging cycles of the battery 102, and 0 (zero) is previously stored in the area as the initial value.

Further, the second battery also has a construction similar to the main battery 64A' shown in FIG. 9, and the embedded controller 80 can also read and write the memory contents of the memory 104 provided in the second battery (not shown).

Figure 10:
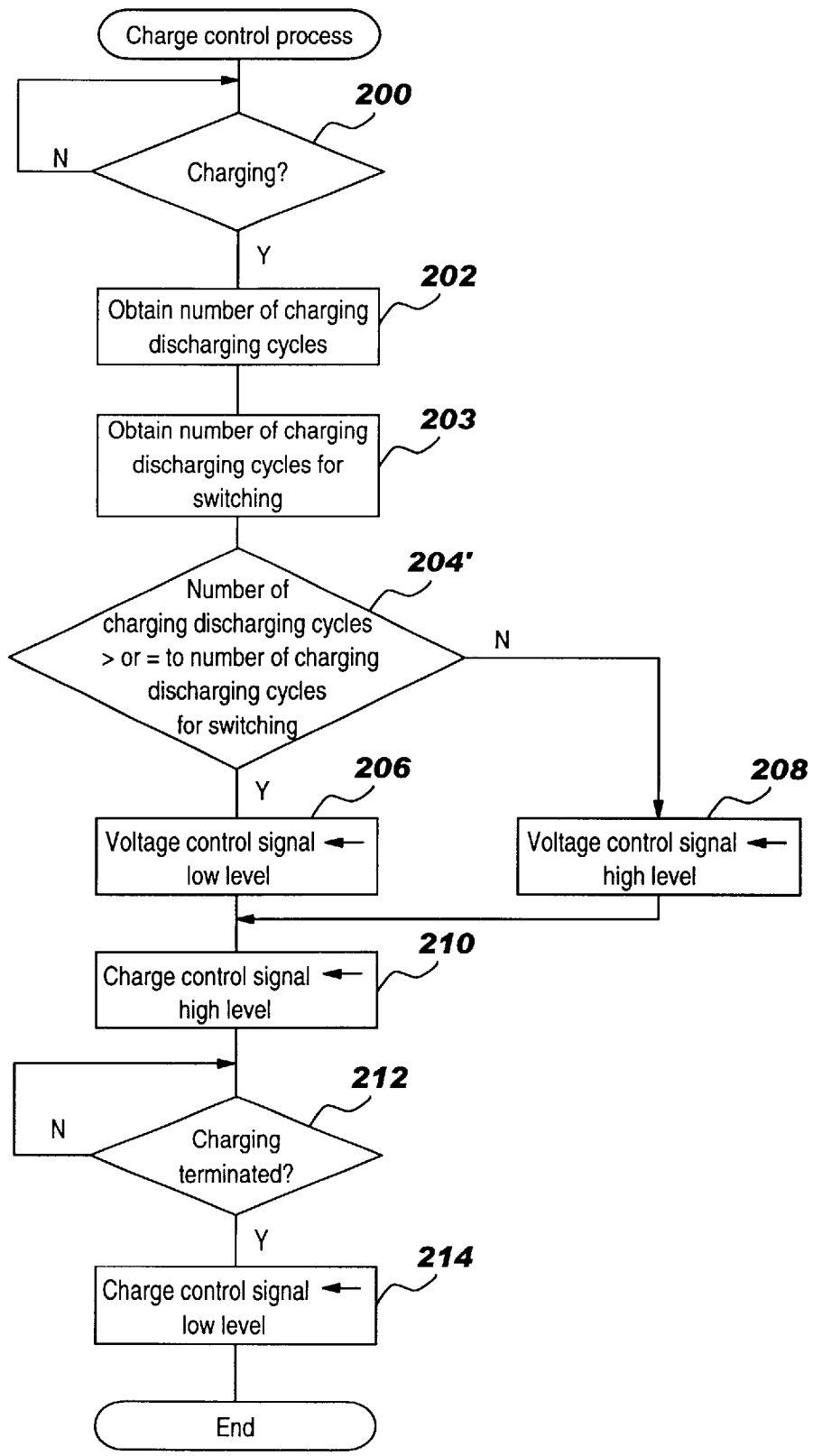
FIG. 10 is a flowchart showing the flow of a charge control processing program executed by the embedded controller related to the second embodiment.
Figure 11:
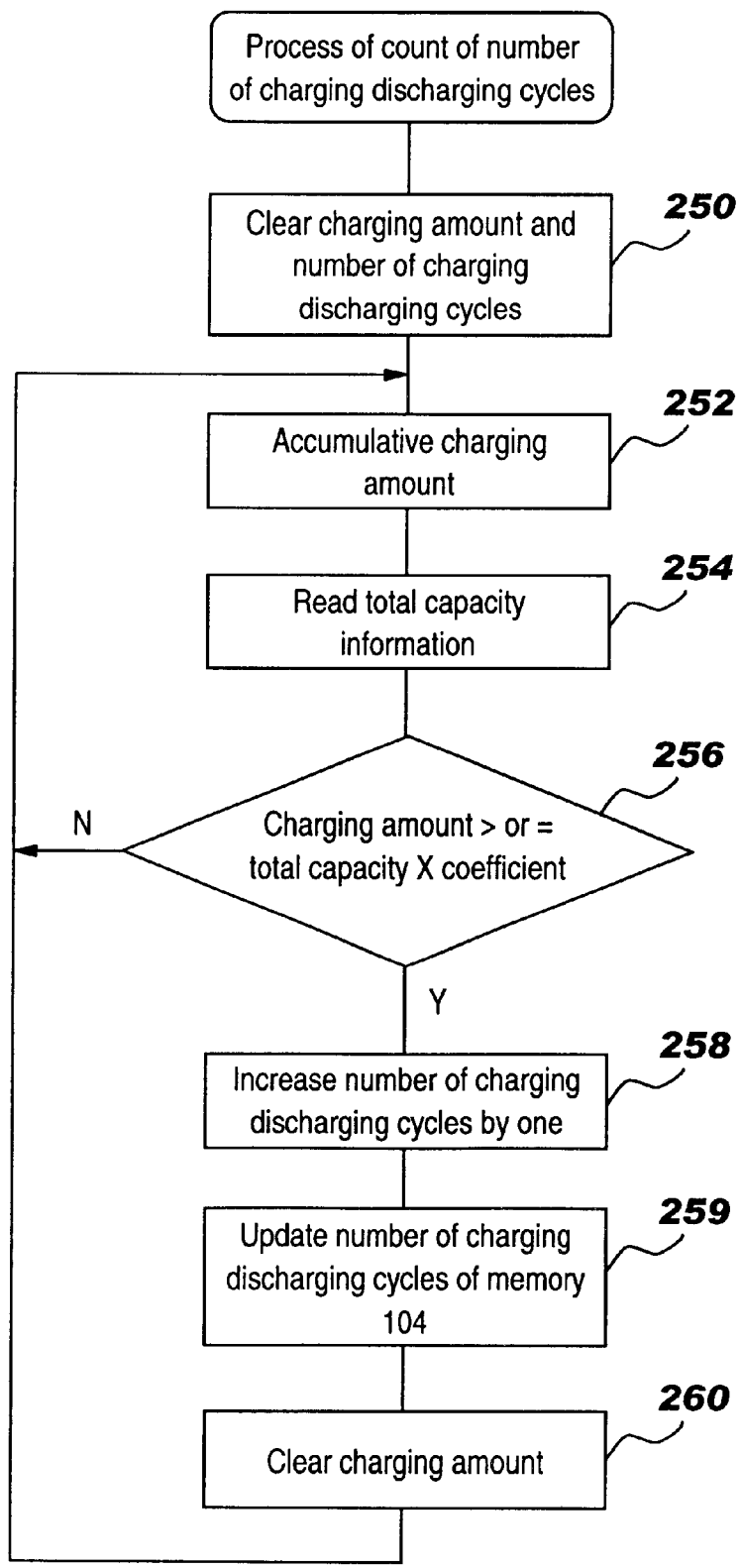
FIG. 11 is a flowchart showing the flow of a program for processing the count of the number of charging/discharging cycles, which is executed by the embedded controller related to the second embodiment.

Now, referring to FIGS. 10 and 11, description is made to the process that is carried out by the embedded controller 80 related to the second embodiment for performing the charge control of the main battery 64A'. FIG. 10 is a flowchart showing the flow of the charge control processing program to be executed by the embedded controller 80, and FIG. 11 is a flowchart showing the flow of the program for processing the count of the number of charging/discharging cycles to be executed by the embedded controller 80, each program being previously stored in a predetermined area of a memory 100 connected to the embedded controller 80. The steps in FIGS. 10 and 11 which perform processing similar to FIGS. 5 and 6 are assigned the same step numbers as FIGS. 5 and 6, and the description of them is omitted.

In step 203 of the charge control process shown in FIG. 10, the number of charging/discharging cycles for switching previously stored in the memory 104 is obtained, and in the next step 204', it is determined whether or not the current number of charging/discharging cycles obtained in the above-mentioned step 202 is equal to or larger than the number of charging/discharging cycles for switching obtained in the step 203, and if it is equal to or larger than the number of charging/discharging cycles for switching (the determination is positive), the process moves to step 206, otherwise (the determination is negative) the process moves to step 208.

On the other hand, in step 259 shown in FIG. 11, which is executed when the number of charging/discharging cycles is incremented by one in the count processing of the number of charging/discharging cycles, the number of charging/discharging cycles is updated by storing the current number of charging/discharging cycles in the area in the memory 104 for storing the actual number of charging/discharging cycles.

As described above, in the computer system related to the second embodiment, the number of charging/discharging cycles of a battery is detected as deterioration information indicating the deterioration state of the battery, and the charging condition of the battery is set to make the battery capacity higher (high capacity mode) until the number of charging/discharging cycles becomes equal to or larger than a predetermined value (in this embodiment, 50), while the charging condition is set to make the battery life longer (long life mode) after the number of charging/discharging cycles becomes predetermined value or larger, so the initial capacity of the battery can be made larger and the battery life can also be made longer.

Further, in the computer system related to the second embodiment, the charging amount of the battery is detected, and for this charging amount, the number of charging/discharging cycles of the battery is detected by employing a capacity obtained by multiplying the total capacity of the battery by a predetermined coefficient as unit cycle, so the number of charging/discharging cycles can be simply and accurately detected even if the battery capacity is not zero or in the vicinity of zero.

Furthermore, in the computer system related to the second embodiment, since the number of charging/discharging cycles for switching and the actual number of charging/discharging cycles of the battery are stored in the memory provided in the battery, the number of charging/discharging cycles for switching accurately corresponding to the connected battery and the actual number of charging/discharging cycles can be known even if the battery was changed, so a plurality of battery types can be supported.

Third Embodiment

In the third embodiment, description is made to an aspect in which a so-called intelligent battery including a memory and a CPU is applied as the battery subjected to charge control.

That is, as the secondary battery that can be used with computers such as portable PCs and various household electrical appliances, attention is now focused on the intelligent battery in which an electronic circuit is incorporated. In accordance with this battery, the remaining capacity of the battery can be informed to the outside by the built-in electronic circuit. Accordingly, by using the intelligent battery as the secondary battery of a portable PC, the user can previously know that the remaining capacity of the secondary battery will exhaust when using the portable PC under an environment in which no commercial power supply is available, by which sudden shutdown during the use can be avoided.

In such intelligent battery, generally information indicating the total capacity of the battery is previously stored, and the remaining capacity of the battery is obtained by subtracting the discharging amount obtained by accumulating the discharging current value of the battery from the total capacity indicated by this information.

For the construction others than the construction of the portion related to the charging of the main battery of the third embodiment and the second battery, description is omitted since it is similar to the above described first and second embodiments.

Figure 12:
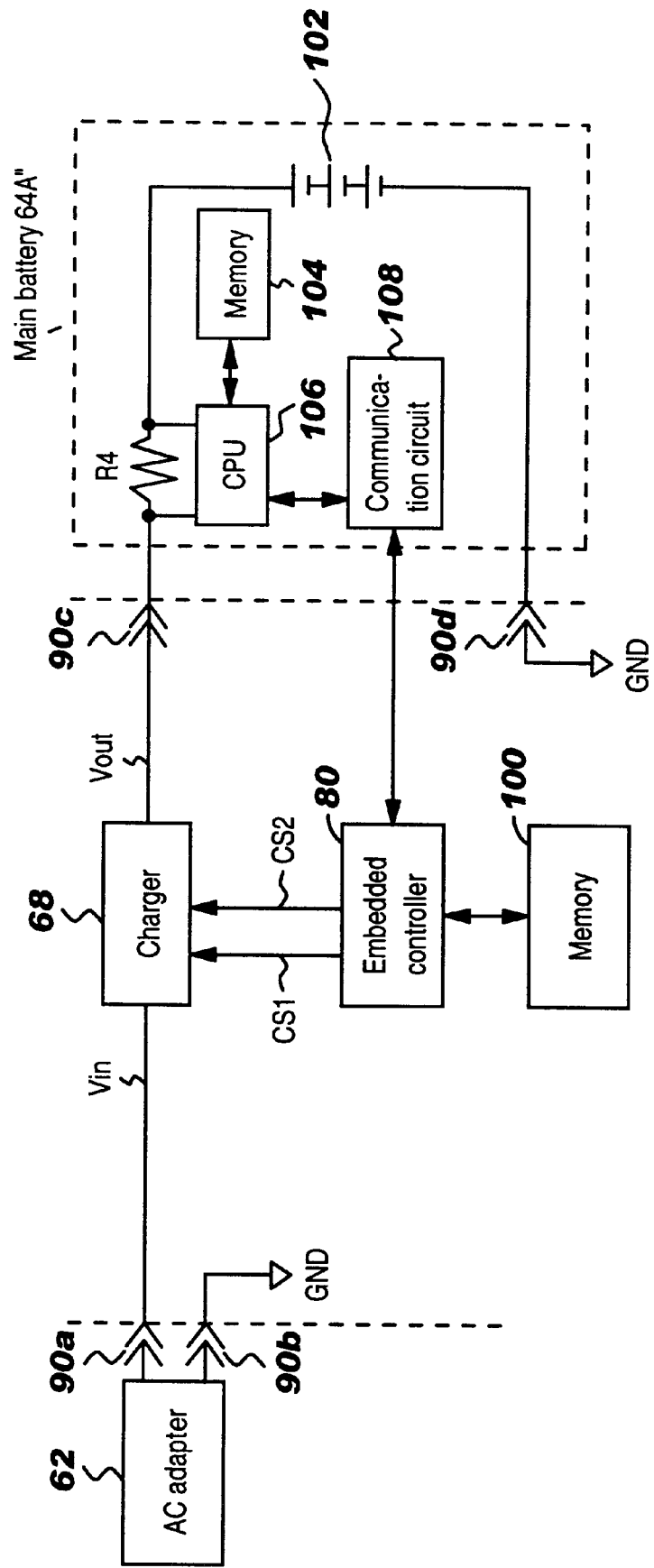
FIG. 12 is a block diagram showing a construction example of the portion concerning the charging to the main battery of the computer system related to the third embodiment.

FIG. 12 shows the construction only of the extracted portion related to the charging to the main battery 64A" related to the third embodiment. The portions in the same figure which are similar to FIG. 9 are assigned the same symbols as FIG. 9, and the description of them is omitted.

As shown in the same figure, the main battery 64A" related to the third embodiment is different from the main battery 64A' of the second embodiment in the point that there are provided a CPU 106 in charge of the overall operation of the main battery 64A", a communication circuit 108 for communicating with the embedded controller 80, and a resistor R4 for detecting the charging amount to the battery 102.

Further, the computer system 10 related to the third embodiment is different from the computer system 10 related to the second embodiment only in the point that the resistor R for detecting the charging amount to the battery 102 is not provided.

In the main battery 64A" related to the third embodiment, the positive electrode of the battery 102 is connected to the terminal 90c via the resistor R4, and both terminals of the resistor 4 are connected to the CPU 106. Accordingly, the CPU 106 is constructed to detect the charging amount to the battery 102 based on the magnitude of the current flowing in the resistor R4. Further, the CPU 106 is connected to the memory 104 and can read and write the memory contents of the memory 104. Furthermore, the CPU 106 is connected to the communication circuit 108, and can send and receive various information between the embedded controller 80.

In addition, the second battery also has a construction similar to the main battery 64A" shown in FIG. 12, and the embedded controller 80 can send and receive various information between the CPU 106 (not shown).

Figure 13:
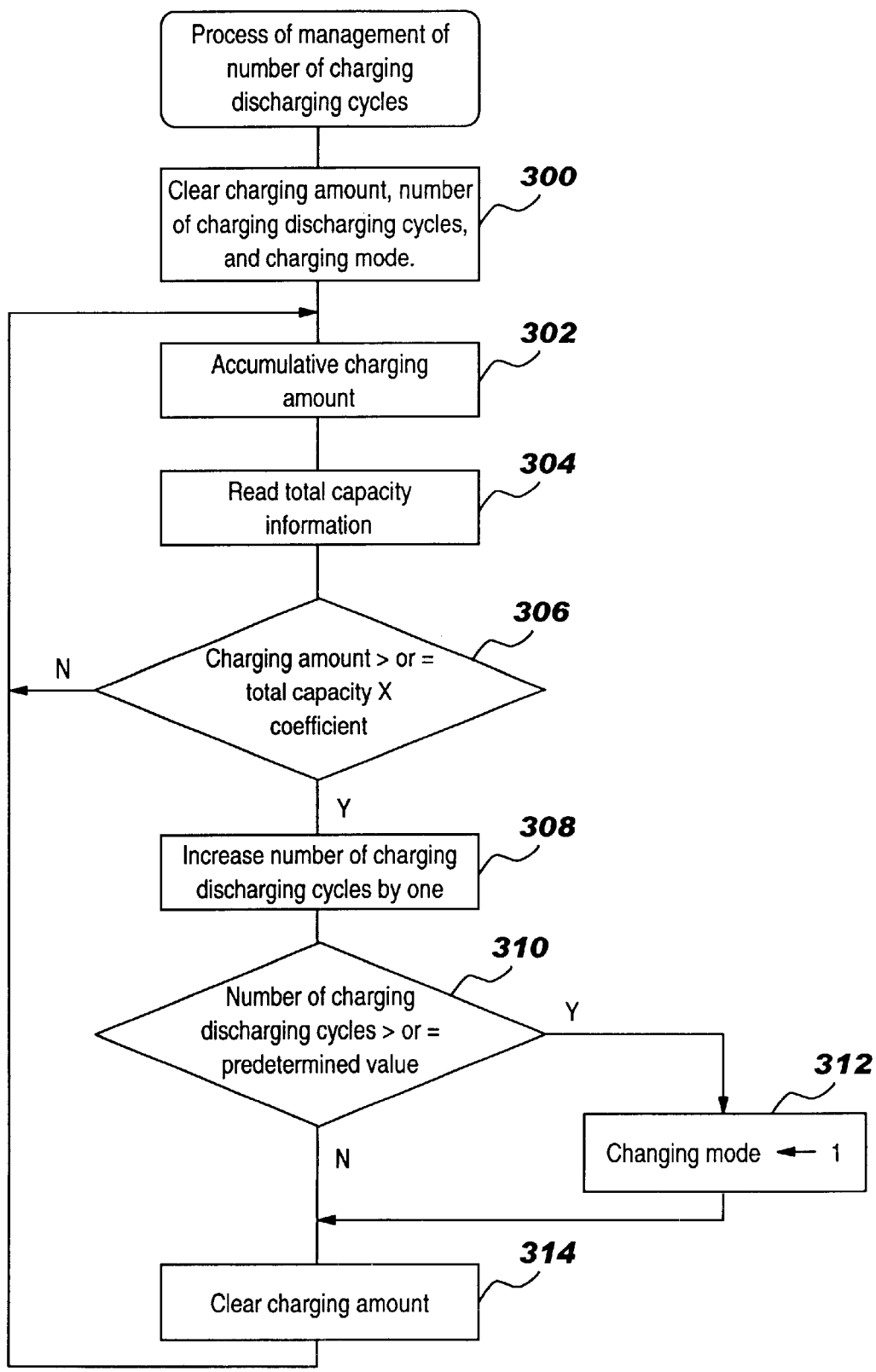
FIG. 13 is a flowchart showing the flow of a program for processing the management of the number of charging/discharging cycles, which is executed by the CPU included in the main battery and second battery related to the third embodiment.
Figure 14:
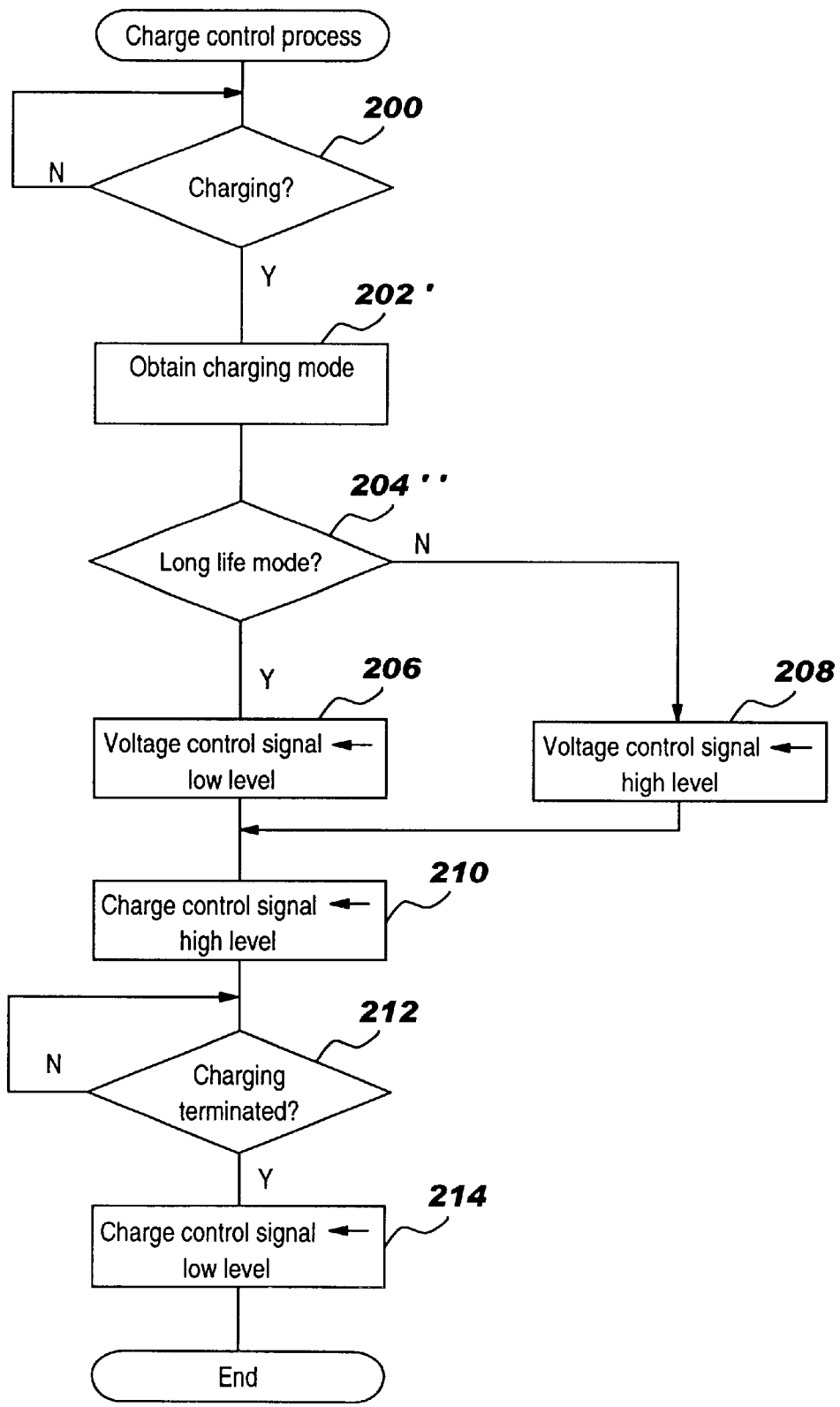
FIG. 14 is a flowchart showing the flow of a charge control processing program executed by the embedded controller related to the third embodiment.
Figure 15:
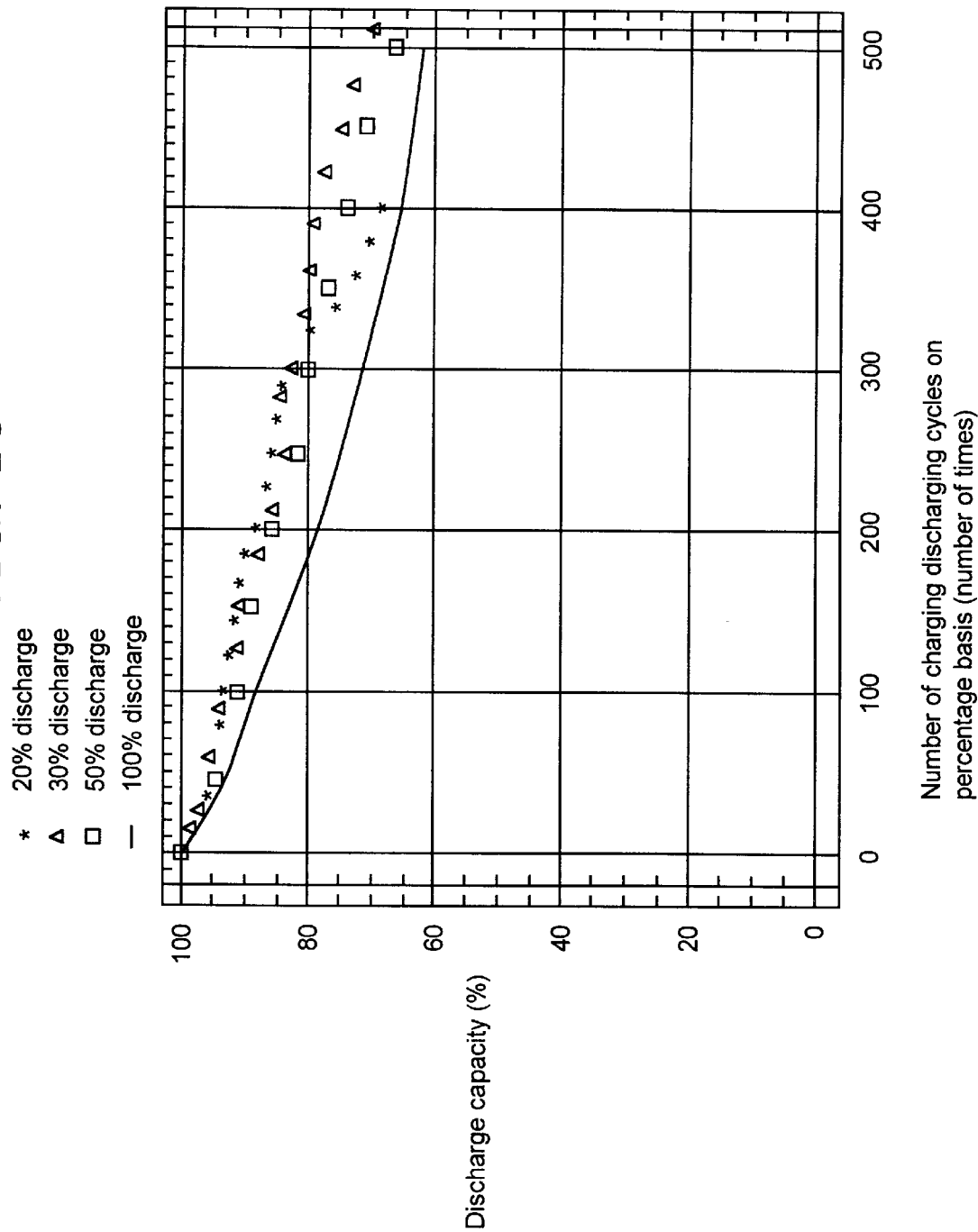
FIG. 15 is a graph showing an example of the relation between the capacity for partial discharge and 10% discharge and the number of charging/discharging cycles on a percentage basis.

Referring to FIGS. 13 and 14, description is made to the process that is executed by the CPU 106 of the main battery 64A" and the embedded controller 80 of the computer system 10 for performing the charging control of the main battery 64A". FIG. 13 is a flowchart showing the flow of the program for processing the management of the number of charging/discharging cycles, which is executed by the CPU 106, and FIG. 14 is a flowchart showing the flow of the program for processing the charge control executed by the embedded controller 80, and the program for processing the management of the number of charging/discharging cycles and the program for processing the charge control are previously stored in the memory 104 and the memory 100, respectively.

First, referring to FIG. 13, the processing of the management of the number of charging/discharging cycles is described. The description is made on the presumption that information indicating the total capacity of the battery 102 is previously stored in the memory 104, and this information is always corrected by the CPU 106 according to the number of charging/discharging cycles of the battery 102.

In step 300 of the same figure, the charging amount, the number of charging/discharging cycles, and the charging mode are cleared, and in the next step 302, the charging amount obtained based on the value of the current flowing in the resistor R4 is accumulated, and in the next step 304, the total capacity of the battery 102 is obtained by reading the information showing the total capacity of the battery 102 from the memory 104, and in the next step 306, it is determined whether or not the accumulated charging amount is equal to or larger than a value obtained by multiplying the total capacity obtained in the above step 304 by a predetermined coefficient (in this embodiment, 0.9). And, if the determination is positive, the process moves to step 308 deeming that the charging for one cycle has been performed, and increments the number of charging/discharging cycles by one, and thereafter, in step 310, it is determined whether or not the number of charging/discharging cycles is equal to or larger than a predetermined value (in the third embodiment, 50). If the number of charging/discharging cycles is equal to or larger than the predetermined value (the determination is positive), the process moves to step 312 where "1" is substituted in the charging mode, and thereafter moves to step 314. Otherwise (if the determination is negative), the process moves to step 314 without carrying out the processing in the step 312. In step 314, the charging amount is cleared, and thereafter the process returns to the above step 302.

On the other hand, if the determination in the above step 306 is negative, the process returns to the step 302 without carrying out the processing in the above steps 308 to 314.

By repeatedly processing the above steps 302 to 314, the charging amount is accumulated for each cycle, and the number of charging/discharging cycles is incremented each time the charging for one cycle is performed, and "1" is substituted in the charging mode when the number of charging/discharging cycles reaches a predetermined value (in this embodiment, 50). That is, originally the number of charging/discharging cycles means the number of times that the discharging is performed until the battery capacity becomes 0% after performing the charging from 0% to 100% of the battery capacity, but, in this embodiment, one cycle is meant when it is deemed from the accumulated value of the charging amount that the charging has been performed from 0% to 100% of the battery capacity. The reason for the assumption based on the accumulated value of the charging amount that the battery capacity has changed from 0% to 100% is as described above.

Further, if '0' (cleared value) is set as the value for the charging mode that is set in the processing of the management of the number of charging/discharging cycles, the high capacity mode is indicated, and if '1' is set, the long life mode is indicated. Furthermore, this charging mode is always sent out to the embedded controller 80 via the communication circuit 108.

Now, referring to FIG. 14, the charge control process executed by the embedded controller 80 is described. The steps in FIG. 14 that are submitted to processing similar to FIG. 5 are assigned the same step numbers as FIG. 5, and the description of them is omitted.

In step 202' in the same figure, the charging mode, which is set to '0' or '1' by the processing of the management of the number of charging/discharging cycles, is obtained, and in the next step 204", it is determined whether or not the obtained charging mode indicates the long life mode, or whether or not the charging mode is '1.' And, if charging mode is '1' (the determination is positive), the process moves to step 206 assuming that it is the long life mode, otherwise (if the determination is negative), moves to step 208 assuming that it is the high capacity mode.

By this charge control process, the voltage applied to the battery 102 is set to 4.20 [V/cell] if the value of the charging mode sent from the main battery 64A" is '0,' which indicates the high capacity mode, and the voltage applied to the battery 102 is set to 4.10 [V/cell] if the value of the charging mode is '1,' which indicates the long life mode.

Further, as to the second battery, the process for charging similar to the foregoing is performed by the CPU 106 in the second battery and the embedded controller 80 in the computer system 10.

As described above, in the computer system related to the third embodiment, the number of charging/discharging cycles of a battery is received from an intelligent battery as the deterioration information related to the deterioration of the battery, and the charging condition of the battery is set to make the battery capacity higher (high capacity mode) until the number of charging/discharging cycles becomes equal to or larger than a predetermined value (in this embodiment, 50), and the charging condition is set to make the battery life longer (long life mode) after the number of charging/discharging cycles becomes equal to or larger than the predetermined value, so the initial capacity of the battery can be made larger and the battery life can also be made longer.

Further, in the main battery and second battery related to the third embodiment, the charging amount of the battery is detected, and for the charging amount, the number of charging/discharging cycles of the battery is detected by employing a capacity obtained by multiplying the total capacity of the battery by a predetermined coefficient as unit cycle, so the number of charging/discharging cycles can be simply and accurately detected even if the battery capacity is not zero or in the vicinity of zero.

Furthermore, in the third embodiment, the description has been made for the case in which the embedded controller 80 is informed of the charging mode by sending numeric data representing the charging mode to the embedded controller 80. However, data representing the charging voltage value may be sent instead of data representing the charging mode. In this case, data indicating (meaning) 4.20 V per cell is sent for the high capacity mode, and data indicating 4.10 V per cell is sent for the long life mode.

Moreover, in each embodiment, the description has been made to the case in which the charging voltage is changed in two steps according to the number of charging/discharging cycles of the battery 102. However, the charging voltage may be switched in the number of steps equal to three or more. In this case, the battery capacity becomes smaller stepwise as compared with each embodiment above, so the reduction of the capacity for the charging voltage switching can be made less incongruous.

Further, in each embodiment above, the description has been made to the case in which the charging voltage is switched according to the number of charging/discharging cycles. In one alternative, the charging voltage may be switched based on the total capacity value of the fully charged battery (the total capacity value obtained by accumulating the current value when the discharging is performed until the capacity becomes zero from the full charge state, accurate total capacity value at this point). That is, the high capacity mode is switched to the long life mode if the above total capacity value becomes a predetermined value or less.

Furthermore, for instance, the charging voltage may be changed based on the amount of battery capacity change per certain number of charging/discharging cycles (for instance, 10 cycles). That is, the high capacity mode is switched to the long life mode if the amount of capacity change becomes a predetermined amount of change or larger.

Moreover, for instance, the charging voltage may be changed based on a value corresponding to the internal resistance of the battery. That is, for instance, allowable minimum voltages corresponding to the various discharge current values of the battery are previously stored in a table, and the discharge current value and the battery voltage of the battery are measured, and the allowable minimum voltage corresponding to the measured discharge current value is obtained from the previously stored table, and the high capacity mode is switched to the long life mode if the measured battery voltage becomes the allowable minimum voltage or less.

An effect similar to each embodiment above can also be produced by such aspects.

Further, in each embodiment above, the description has been made for the case in which a lithium-ion battery is applied as the battery 102 subjected to charge control, and the high capacity mode and the long life mode are switched by switching the charging voltage for the battery 102, but the present invention is not limited to this.

That is, since the charging of the lithium-ion battery is based on the constant-current, constant-voltage method, the high capacity mode and the long life mode are switched by switching the charging voltage in each embodiment above.

On the other hand, for instance, the nickel-hydrogen battery is based on the constant-current charging method, and the completion of the charging is determined by the value of $\Delta T$ which is temperature rise value based on the temperature at the beginning of the charging, or $\Delta T/\Delta t$ which is the temperature rise value per unit time. Accordingly, for the nickel-hydrogen battery, the high capacity mode and the long life mode can be switched by changing the determination criterion of charging termination for at lease either $\Delta T$ or $\Delta T/\Delta t$ instead of switching the charging voltage.

Specifically, if the determination criterion of charging termination by $\Delta T$ is changed, for instance, $\Delta T$ is set to a temperature rise value (for instance, 23° C.) substantially equal to the allowable upper limit value in the high capacity mode, and in the long life mode, it is set to a temperature rise value (for instance, 18° C.) smaller than that in the high capacity mode. Further, if the determination criterion of charging termination by $\Delta T/\Delta t$ is changed, for instance, in the high capacity mode, $\Delta T/\Delta t$ is set to a temperature rise value per unit time (for instance, 2.0° C./min) substantially equal to the allowable upper limit, and in the long life mode, it is set to a temperature rise value per unit time (for instance, 1.5° C./min) smaller than that in the high capacity mode.

On the other hand, for instance, for the nickel-cadmium battery, detecting a change in the battery voltage terminates the charging. Accordingly, for the nickel-cadmium battery, the high capacity mode and the long life mode can be switched by changing the determination criterion of charging termination based on the change in the battery voltage.

By such processing, an effect similar to each embodiment above can be produced even if the object of charge control is a nickel-hydrogen battery or a nickel-cadmium battery.

Further, in each embodiment above, the description has been made to the case in which the deterioration state of the battery is determined based on the number of charging/discharging cycles, but the present invention is not limited to this, and for instance, it is also possible that the total charging amount or the total discharging amount is counted from the beginning of the use of the battery, and it is determined that the larger the count value, the larger the degree of deterioration of the battery is. In this case, the process can be simplified because it is not needed to perform the process for counting the number of charging/discharging cycles.

Furthermore, in each embodiment above, the description has been made to the case in which the charging voltage is automatically controlled, but the present invention is not limited to this, and for instance, it is also possible that "high capacity mode (4.2 V charging)", "long life mode (4.1 V charging)" and "auto-mode (automatic control)" are displayed in a menu style on the LCD of the computer system 10, allowing the user to select preferred one. In this case, if the high capacity mode is selected, the 4.2 V charging is always performed, and if the long life mode is selected, the 4.1 V charging is always performed, and if the auto-mode is selected, the charge control is performed in a manner similar to each embodiment above. This allows the charge control more satisfactory for the user's intention can be executed. Further, as a variation of this, it is also possible that default is the "auto-mode" and the "high capacity mode" or the "long life mode" can be selectively set only if desired by the user.

Moreover, in each embodiment above, the description has been made to the case in which the number of charging/discharging cycles of the corresponding battery is detected based on the accumulated value of the charging amount of each battery, but the present invention is not limited to this, and the number of charging/discharging cycles of the corresponding battery may be detected based on the accumulated value of the discharging amount of each battery. Also in this case, an effect similar to each embodiment above can be produced.

In addition, the charge control method according to each embodiment can be programmed using various programming languages, as described above.

This program can be recorded on a machine-readable recording medium. As the recording medium, memories mounted on a computer system, such as ROM (Read Only Memory), EEPROM (Electrically Erasable Programmable Read Only Memory), and flash EEPROM (flash EEPROM), portable recording media such as floppy disk (FD), CD-ROM (read only memory using compact disk), and MO (Magneto-Optical) disk, or external memories provided in the server computers connected to a network can be used.

The program recorded on the recording medium is taken in the computer in the following manner. If the recording medium having recorded thereon the above program is a portable recording medium, it is loaded in a drive, and the program recorded on the portable recording medium is read in. The read program is stored in the main memory.

If the recording medium is an external memory on a network, the program recorded in the external memory is downloaded through a network connection device. The downloaded program is stored in the main memory.

As described above, deterioration information concerning the deterioration of a battery is received from an intelligent battery, and the charging condition is set to make the battery capacity higher until the deterioration information meets a predetermined condition, and the charging condition is set to make the battery life longer after the deterioration information meets the predetermined condition, so there is provided an excellent advantage that the initial capacity of the battery can be made larger and the battery life can also be made longer.

What is claimed is:

1. A battery charging system comprising:
   a charging device capable of setting a charging condition, for charging a rechargeable battery included in an intelligent battery; and
   a controller for receiving deterioration information related to the deterioration of said rechargeable battery from said intelligent battery, for setting the charging condition of said charging device so as to increase a capacity of said rechargeable battery until said deterioration information meets a predetermined condition, and for setting said charging condition so as to increase the life of said rechargeable battery after said deterioration information meets said predetermined condition.

2. The charging system according to claim 1, wherein said deterioration information is selected from a group comprising: the number of charging/discharging cycles of said rechargeable battery, the capacity of said rechargeable battery, and a value corresponding to an internal resistance of said rechargeable battery.

3. The charging system according to claim 2, wherein, when said deterioration information is based on the number of charging/discharging cycles of said rechargeable battery, said number of charging/discharging cycles is detected in a manner in which a discharging amount or charging amount of said rechargeable battery is detected, and for the detected amount, the total capacity of said rechargeable battery or a capacity obtained by multiplying the total capacity of said rechargeable battery by a predetermined coefficient is used as unit cycle.

4. The charging system according to claim 1, wherein said charging condition is a charging voltage of said rechargeable battery or a determination condition of a charging termination of said rechargeable battery.

5. A charge control apparatus for controlling the charging of a rechargeable battery included in a power supply unit, comprising:
   a charging device for charging said rechargeable battery;
   a deterioration information detector for detecting the deterioration information indicating the deterioration state of said rechargeable battery;
   a setting device for setting a charging condition of said rechargeable battery so as to increase a capacity of said rechargeable battery until said deterioration information meets a predetermined condition, and for setting said charging condition to so as to increase a life of said rechargeable battery after said deterioration information meets said predetermined condition.

6. The charge control apparatus according to claim 5, wherein said deterioration information is at least one of: the number of charging/discharging cycles of said rechargeable battery, the capacity of said rechargeable battery, and a value corresponding to an internal resistance of said rechargeable battery.

7. The charge control apparatus according to claim 6, wherein, if said deterioration information detector detects the number of charging/discharging cycles of said rechargeable battery as said deterioration information, it detects the number of charging/discharging cycles of said rechargeable battery in a manner in which a discharging amount or charging amount of said rechargeable battery is detected, and for the detected amount, the total capacity of said rechargeable battery or a capacity obtained by multiplying the total capacity of said rechargeable battery by a predetermined coefficient is used as unit cycle.

8. The charge control apparatus according to claim 5, wherein said charging condition is one of: a charging voltage of said rechargeable battery or a determination condition for a charging termination of said rechargeable battery.

9. A method for controlling the charging of a rechargeable battery included in a power supply unit, comprising the steps of:
   detecting deterioration information indicating the deterioration state of said rechargeable battery; and
   setting a charging condition of said rechargeable battery so as to increase a capacity of said rechargeable battery until said deterioration information meets a predetermined condition, and setting said charging condition so as to increase a life of said rechargeable battery after said deterioration information meets said predetermined condition.

10. The charge control method according to claim 9, wherein said deterioration information is at least one of the number of charging/discharging cycles of said rechargeable battery, the capacity of said rechargeable battery, and a value corresponding to an internal resistance of said rechargeable battery.

11. The method according to claim 10, wherein the number of charging/discharging cycles is determined by detecting a discharging amount or charging amount of said rechargeable battery, and for the detected amount, the total capacity of said rechargeable battery or a capacity is obtained by multiplying the total amount of said rechargeable battery by a predetermined coefficient is used as a unit cycle.

12. The method according to claim 9, wherein said charging condition is a charging voltage of said rechargeable battery or a determination condition for a charging termination of said rechargeable battery.

13. A machine-readable recording medium having recorded thereon a program for controlling the charging of a rechargeable battery included in a power supply unit, said machine-readable recording medium having recorded thereon machine-executable program code for carrying out the steps of:
    detecting deterioration information indicating a deterioration state of said rechargeable battery; and
    setting a charging condition of said rechargeable battery to increase a capacity of said rechargeable battery until said deterioration information meets a predetermined condition, and setting said charging condition so as to increase a life of said rechargeable battery longer after said deterioration information meets said predetermined condition.

14. The machine-readable recording medium according to claim 13, wherein said deterioration information is at least one of the number of charging/discharging cycles of said rechargeable battery, the capacity of said rechargeable battery, and a value corresponding to the internal resistance of said rechargeable battery.

15. The machine-readable recording medium according to claim 14, wherein, to detect the number of charging/discharging cycles of said rechargeable battery, a discharging amount or charging amount of said rechargeable battery is detected, and for the detected amount, the total capacity of said rechargeable battery or a capacity obtained by multiplying the total capacity of said rechargeable battery by a predetermined coefficient is used as a unit cycle.

16. The machine-readable recording medium according to claim 13, wherein said charging condition is a charging voltage of said rechargeable battery or a determination condition for a charging termination of said rechargeable battery.

17. A data processing system comprising:
a CPU;
a memory;
a display;
an intelligent battery including a rechargeable battery for supplying power to said CPU, memory and display; and
a battery charging system comprising:
  a charging device capable of setting a charging condition, for charging said rechargeable battery; and
  a controller for receiving deterioration information related to the deterioration of said rechargeable battery from said intelligent battery, for setting the charging condition of said charging device so as to increase a capacity of said rechargeable battery until said deterioration information meets a predetermined condition, and for setting said charging condition so as to increase the life of said rechargeable battery after said deterioration information meets said predetermined condition.

* * * * *